(12) United States Patent
Hasegawa et al.

(10) Patent No.: US 7,310,208 B2
(45) Date of Patent: Dec. 18, 2007

(54) MAGNETORESISTIVE SENSOR CONTAINING SELF-PINNED LAYER CONTAINING A PLURALITY OF MAGNETIC SUBLAYERS WITH MAGNETOSTRICTION-ENHANCING LAYER MADE OF A NONMAGNETIC MATERIAL

(75) Inventors: Naoya Hasegawa, Niigaka-ken (JP); Masamichi Saito, Niigaka (JP); Eiji Umetsu, Niigaka-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 354 days.

(21) Appl. No.: 11/156,677

(22) Filed: Jun. 20, 2005

(65) Prior Publication Data
US 2006/0002039 A1    Jan. 5, 2006

(30) Foreign Application Priority Data
Jun. 21, 2004   (JP) .............................. 2004-182337

(51) Int. Cl.
*G11B 5/39* (2006.01)
(52) U.S. Cl. ................................ 360/324.11
(58) Field of Classification Search ............ 360/324.11
See application file for complete search history.

(56) References Cited

U.S. PATENT DOCUMENTS 5,583,725 A    12/1996   Coffey et al.

FOREIGN PATENT DOCUMENTS

| JP | 8-7235 | * 12/1996 |
|----|--------|-----------|
| JP | 2002-092826 | 3/2002 |
| JP | 2002-150512 | 5/2002 |
| JP | 2002-319112 | 10/2002 |
| JP | 2003-031867 | 1/2003 |

* cited by examiner

*Primary Examiner*—A. J. Heinz
(74) *Attorney, Agent, or Firm*—Brinks Hofer Gilson & Lione

(57) ABSTRACT

A first magnetic sublayer constituting a pinned magnetic layer is provided in contact with a first magnetostriction-enhancing layer to increase the magnetostriction constant of the first magnetic sublayer. In addition, a nonmagnetic intermediate sublayer constituting the pinned magnetic layer is made of a material having a lattice constant larger than that of Ru, such as a Ru—X alloy, to distort the crystal structures of the first magnetic sublayer and a second magnetic sublayer each in contact with the nonmagnetic intermediate sublayer, increasing the magnetostriction constants of the first magnetic sublayer and the second magnetic sublayer.

10 Claims, 8 Drawing Sheets

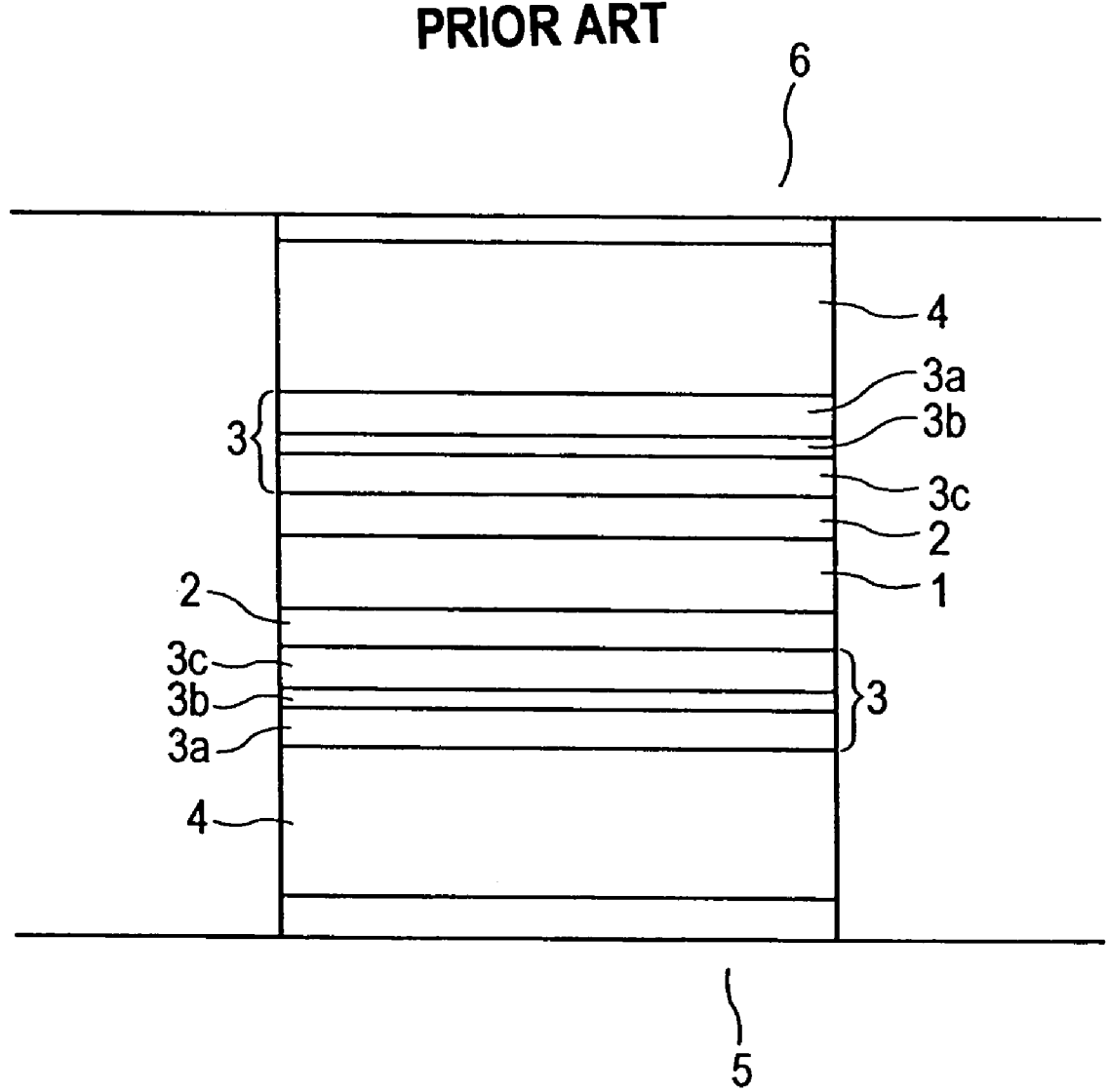

MAGNETORESISTIVE SENSOR CONTAINING SELF-PINNED LAYER CONTAINING A PLURALITY OF MAGNETIC SUBLAYERS WITH MAGNETOSTRICTION-ENHANCING LAYER MADE OF A NONMAGNETIC MATERIAL

This application claims the benefit of priority to Japanese Patent Application No. 2004-182337, filed on Jun. 21, 2004, herein incorporated by reference.

BACKGROUND OF THE INVENTION

1. Field of the Invention

The present invention relates to a magnetoresistive sensor in which the magnetization of a pinned magnetic layer is firmly fixed by the uniaxial anisotropy of the pinned magnetic layer.

2. Description of the Related Art

In conventional magnetoresistive sensors, the magnetization of a pinned magnetic layer is generally fixed by utilizing an exchange coupling magnetic field generated between the pinned magnetic layer and an antiferromagnetic layer, for example, having a thickness of about 20 nm.

FIG. 12 is a schematic view of the structure of a magnetoresistive sensor of a conventional CPP type. Specifically, above and below a free magnetic layer 1 are disposed upper and lower pinned magnetic layers 3, 3 and upper and lower antiferromagnetic layers 4, 4 with upper and lower nonmagnetic material layers 2, 2 interposed between the free magnetic layer 1 and the upper and the lower pinned magnetic layer 3, 3. This multilayer film is sandwiched between a lower electrode 5 and an upper electrode 6.

The term "current perpendicular to the plane (CPP) type" used herein means a structure in which an electric current flows in the direction perpendicular to the transverse surfaces of each layer in the multilayer film. On the other hand, the term "current in the plane (CIP) type" used herein means a structure in which an electric current flows in the direction parallel to the transverse surfaces of each layer in the multilayer film.

Although most of currently-used magnetoresistive sensors are of the CIP type, magnetoresistive sensors of the CPP type can be advantageously downsized and have an improved playback output, as compared with the magnetoresistive sensors of the CIP type. Thus, the magnetoresistive sensors of the CPP type are expected to comply with future higher recording densities.

However, in the structure shown in FIG. 12, the antiferromagnetic layers 4, 4 have a specific resistance as high as about 200 $\mu\Omega \cdot cm^2$ (or more). Thus, when an electric current flows between the lower electrode 5 and the upper electrode 6, the antiferromagnetic layers 4, 4 act as heat sources, generating a Joule heat. The generated Joule heat enhances phonon scattering due to lattice vibration or the electromigration of conduction electrons in the adjacent pinned magnetic layers 3, 3, the nonmagnetic material layers 2, 2, and the free magnetic layer 1.

As a result, it was found that, in the magnetoresistive sensors of the CPP type, the GMR effect represented by the resistance change per unit area ($\Delta R \cdot A$) could not be improved.

Furthermore, in the magnetoresistive sensors of the CIP type, the antiferromagnetic layers 4, 4 principally cause shunt loss of a sense current. Providing for higher recording densities of recording media, the magnetoresistive sensor is suffered from a low output due to the shunt loss of the sense current.

Furthermore, in the magnetoresistive sensors of both the CIP type and the CPP type, a very thick antiferromagnetic layer results in an increased distance between shielding layers on and under the multilayer film, making the structure unsuitable for the recording media having higher linear recording densities.

In a magnetoresistive sensor disclosed in Japanese Unexamined Patent Application Publication No. 8-7235 (hereinafter referred to as JP-08007235-A), the antiferromagnetic layer is removed from a multilayer film, and the magnetization of a pinned magnetic layer is fixed by the uniaxial anisotropy of the pinned magnetic layer.

In the JP-08007235-A, a pinned ferromagnetic layer 70 (pinned magnetic layer) is stacked on a base of a buffer layer 62 made of tantalum. However, a principle by which the magnetization of the pinned ferromagnetic layer 70 can be firmly fixed using the buffer layer 62 made of tantalum is not clear. Since tantalum tends to be amorphous, the buffer layer 62 made of tantalum, in practice, will not firmly fix the magnetization of the pinned ferromagnetic layer 70 (pinned magnetic layer). Furthermore, since tantalum has a high specific resistance, when the structure according to the JP-08007235-A is applied to the magnetoresistive sensors of the CPP type, the buffer layer 62 will act as a heat source like the conventional antiferromagnetic layer. This causes scattering independent of the spin of a conduction electron and therefore the GMR effect will not be improved. Thus, the structure according to the JP-08007235-A cannot be employed as such.

Furthermore, in the JP-08007235-A, a ferromagnetic film 74 away from the buffer layer 62 is not "self-pinned". In the structure according to the JP-08007235-A, a ferromagnetic film 72 and the ferromagnetic film 74 are liable to vary with an external magnetic field while maintaining antiparallel magnetization.

In the JP-08007235-A, it should be avoided to change the conventional structure of an interface between the ferromagnetic film 74 and a copper spacer layer 63 to enhance the fixed magnetization of the ferromagnetic film 74, because this change deteriorates a CIP-GMR effect.

As disclosed in the JP-08007235-A, a layer 73 between the ferromagnetic films 72 and 74 is made of ruthenium (Ru). As described in paragraph [0031] in the JP-08007235-A, the magnetizations of the ferromagnetic films 72 and 74 are aligned antiparallel with each other owing to an antiferromagnetic exchange coupling through the Ru antiferromagnetically coupling film 73.

The Ru antiferromagnetically coupling film 73 has a function of increasing the magnetostrictions of the ferromagnetic films 72 and 74 to some extent. The increased magnetostrictions help to enhance the uniaxial anisotropy and the fixed magnetization of the pinned magnetic layer, as described below. However, since the magnetostriction-enhancing effect of the Ru antiferromagnetically coupling film 73 is not so large, the magnetizations of the ferromagnetic films 72 and 74 made of Co cannot be firmly fixed in any event in the laminated structure of Ta (buffer layer 62)/Co (ferromagnetic film 72)/Ru (antiferromagnetically coupling film 73)/Co (ferromagnetic film 74) as in the JP-08007235-A1.

SUMMARY OF THE INVENTION

Accordingly, to solve the conventional problems, it is an object of the present invention to provide a magnetoresistive sensor in which the structure of a nonmagnetic intermediate sublayer constituting a pinned magnetic layer in an artificial ferri structure is improved, the magnetostrictions of adjacent magnetic layers on and under the nonmagnetic intermediate sublayer can be increased, and thus the pinned magnetic layer can be firmly fixed.

The present invention provides a magnetoresistive sensor comprising a multilayer film containing a pinned magnetic layer, a nonmagnetic material layer, and a free magnetic layer, wherein the pinned magnetic layer contains a plurality of magnetic sublayers with a nonmagnetic intermediate sublayer interposed therebetween, a first magnetostriction-enhancing layer made of a nonmagnetic metal is in contact with the opposite side of a first magnetic sublayer to the nonmagnetic material layer, the first magnetic sublayer being the farthest of the plurality of magnetic sublayers from the nonmagnetic material layer, at least the top surface and/or the bottom surface of at least one nonmagnetic intermediate sublayer has a lattice constant larger than that of Ru, at least part of crystal in the first magnetostriction-enhancing layer and in the first magnetic sublayer, and at least part of crystal in the nonmagnetic intermediate sublayer and in the magnetic sublayer in contact with a side of the nonmagnetic intermediate sublayer, the side having a lattice constant larger than that of Ru, are in an epitaxial or a heteroepitaxial state, and the pinned magnetic layer has an open end face opposite to a recording medium.

The present invention can be applied to the magnetoresistive sensor of either the current in the plane (CIP) type or the current perpendicular to the plane (CPP) type.

The present invention provides a self-pinned magnetoresistive sensor, in which the magnetization of the pinned magnetic layer is fixed by the uniaxial anisotropy of the pinned magnetic layer.

The anisotropic magnetic field of a ferromagnetic film is defined by a magnetocrystalline anisotropy, an induced magnetic anisotropy, and a magnetoelastic effect. The present invention was achieved by focusing the attention on the magnetoelastic effect that controls the uniaxial anisotropy that fixes the magnetization of the pinned magnetic layer.

The magnetoelastic effect depends on the magnetoelastic energy. The magnetoelastic energy is defined by the stress on the pinned magnetic layer and the magnetostriction constant $\lambda s$ of the pinned magnetic layer.

In the present invention, since the pinned magnetic layer has the open end face opposite to the recording medium, the stress on the pinned magnetic layer becomes asymmetric. Thus, the pinned magnetic layer is under a tensile stress in the direction of the height of the sensor (in the height direction; in the direction normal to the face opposite to the recording medium). According to the present invention, the magnetoelastic energy is increased by increasing the magnetostriction constant $\lambda s$ of the pinned magnetic layer. The large magnetoelastic energy results in large uniaxial anisotropy of the pinned magnetic layer. The large uniaxial anisotropy of the pinned magnetic layer allows the magnetization of the pinned magnetic layer to be fixed firmly and unidirectionally. This increases the output of the magnetoresistive sensor and improves the stability and the symmetry of the output.

According to the present invention, the pinned magnetic layer has an artificial ferri structure containing a plurality of magnetic layers with a nonmagnetic intermediate sublayer interposed therebetween.

The first magnetostriction-enhancing layer made of the nonmagnetic metal is in contact with the opposite side of the first magnetic sublayer to the nonmagnetic material layer. The first magnetic sublayer is the farthest of the plurality of magnetic sublayers from the nonmagnetic material layer. The first magnetic sublayer and the first magnetostriction-enhancing layer are in contact with each other in the epitaxial or the heteroepitaxial state. This causes a distortion in the crystal structure of the first magnetic sublayer, increasing the magnetostriction constant $\lambda s$ of the first magnetic sublayer. In this way, the magnetostriction constant $\lambda s$ of the first magnetic sublayer can be increased.

Conventionally, the nonmagnetic intermediate sublayer generally has a Ru monolayer structure. The Ru nonmagnetic intermediate sublayer can generate strong antiparallel coupling due to the RKKY interaction between the magnetic sublayers on both sides of the nonmagnetic intermediate sublayer. The Ru nonmagnetic intermediate sublayer can also efficiently maintain the magnetizations of the magnetic sublayers in an antiparallel state. In addition, the antiparallel coupling caused by the RKKY interaction using Ru exhibits excellent thermal stability and high environmental resistance.

However, the Ru nonmagnetic intermediate sublayer has a smaller magnetostriction-enhancing effect on the magnetic sublayers than the first magnetostriction-enhancing layer. Thus, in particular, the magnetic sublayer that is not in contact with the first magnetostriction-enhancing layer is not appropriately increased in the magnetostriction. Thus, the magnetizations of all the magnetic sublayers constituting the pinned magnetic layer cannot be firmly fixed.

According to the present invention, at least the top surface and/or the bottom surface of the nonmagnetic intermediate sublayer therefore has a higher lattice constant larger than that of Ru. This generates a distortion in the crystal structure of the magnetic sublayer in contact with a side of the nonmagnetic intermediate sublayer, the side having a lattice constant larger than that of Ru. This increases the magnetostriction constant $\lambda s$ of the magnetic sublayer.

In a particularly preferred structure according to the present invention, the pinned magnetic layer has a three-layer structure consisting of the first magnetic sublayer, which is the farthest from the nonmagnetic material layer, a second magnetic sublayer, which is the nearest to the nonmagnetic material layer, and the nonmagnetic intermediate sublayer between the first magnetic sublayer and the second magnetic sublayer. The nonmagnetic intermediate sublayer has a lattice constant larger than that of Ru at least at the side in contact with the second magnetic sublayer.

The magnetostriction of the first magnetic sublayer is increased by the magnetostriction-enhancing effect of the first magnetostriction-enhancing layer. However, since the second magnetic sublayer is far from the first magnetostriction-enhancing layer, the magnetostriction-enhancing effect of the first magnetostriction-enhancing layer on the second magnetic sublayer is small. Thus, at least the contact side of the nonmagnetic intermediate sublayer with the second magnetic sublayer preferably has a magnetostriction-enhancing effect to increase the magnetostriction constant of the second magnetic sublayer.

In the present invention, the structure of the nonmagnetic intermediate sublayer constituting the pinned magnetic layer is modified, but the structure of the interface between the nonmagnetic material layer and the pinned magnetic layer (second magnetic sublayer) is not changed. Thus, the magnetization of the pinned magnetic layer can be firmly fixed while the GMR effect is not weakened.

The present invention also provides a structure in which the entire nonmagnetic intermediate sublayer is made of a nonmagnetic material having a lattice constant larger than that of Ru.

In this case, the nonmagnetic intermediate sublayer is preferably made of a Ru—X alloy, wherein the element X is selected from the group consisting of Re, Ir, and Os, or a mixture thereof.

Alternatively, the nonmagnetic intermediate sublayer according to the present invention may have a laminated structure that contains a Ru subsublayer composed of Ru and a second magnetostriction-enhancing subsublayer and/or a third magnetostriction-enhancing subsublayer each having a lattice constant larger than that of Ru on the top surface and/or the bottom surface of the Ru subsublayer. In this case, the second magnetostriction-enhancing subsublayer and the third magnetostriction-enhancing subsublayer are preferably composed of one element selected from the group consisting of Re, Ir, and Os, or a mixture thereof.

Thus, the crystal structure of the magnetic sublayer in contact with a side of the nonmagnetic intermediate sublayer, the side having a lattice constant larger than that of Ru, can be appropriately distorted, and thereby the magnetization of the magnetic sublayer can be firmly fixed.

Preferably, the second magnetostriction-enhancing subsublayer and the third magnetostriction-enhancing subsublayer have smaller thicknesses than the Ru subsublayer.

One of the important roles of the nonmagnetic intermediate sublayer is to generate antiparallel coupling due to the RKKY interaction between the magnetic sublayers on both sides of the nonmagnetic intermediate sublayer to magnetize the magnetic sublayers in an antiparallel state. Thus, the second magnetostriction-enhancing subsublayer or the third magnetostriction-enhancing subsublayer each having a smaller thickness than the Ru subsublayer is preferably provided on the top surface or the bottom surface of the Ru subsublayer to enhance the antiparallel coupling caused by the RKKY interaction and to ensure the thermal stability of the antiparallel coupling.

In the present invention, the entire first magnetostriction-enhancing layer or the first magnetostriction-enhancing layer in the vicinity of the interface with the first magnetic sublayer, and/or at least a side having a lattice constant larger than that of Ru in the nonmagnetic intermediate sublayer preferably has a face-centered cubic (fcc) structure having a preferred orientation of an equivalent crystal face represented by a {111} face in the direction parallel to the interface.

In the present invention, the entire first magnetic sublayer or the first magnetic sublayer in the vicinity of the interface with the first magnetostriction-enhancing layer, and/or the entire magnetic sublayer in contact with a side of the nonmagnetic intermediate sublayer or the magnetic sublayer in the vicinity of the interface with the nonmagnetic intermediate sublayer, the side having a lattice constant larger than that of Ru, preferably has a face-centered cubic (fcc) structure having a preferred orientation of an equivalent crystal face represented by a {111} face in the direction parallel to the interface.

In the present invention, the entire first magnetic sublayer or the first magnetic sublayer in the vicinity of the interface with the first magnetostriction-enhancing layer, and/or the entire magnetic sublayer in contact with a side of the nonmagnetic intermediate sublayer or the magnetic sublayer in the vicinity of the interface with the nonmagnetic intermediate sublayer, the side having a lattice constant larger than that of Ru, preferably has a body-centered cubic lattice (bcc) structure having a preferred orientation of an equivalent crystal face represented by a {110} face in the direction parallel to the interface.

When the magnetic sublayers constituting the pinned magnetic layer assume the fcc structure or the bcc structure and show a preferred orientation of an equivalent crystal face represented by the {111} face or the {110} face in the direction parallel to the interface as described above, atoms constituting the magnetic sublayers and atoms constituting the first magnetostriction-enhancing layer or the nonmagnetic intermediate sublayer easily overlap one another.

According to the present invention, not only the first magnetostriction-enhancing layer in contact with the first magnetic sublayer in the pinned magnetic layer increases the magnetostriction constant of the first magnetic sublayer, but also the nonmagnetic intermediate sublayer made of a material having a lattice constant larger than that of Ru, such as a Ru—X alloy, in the pinned magnetic layer can also increase the magnetostriction constants of the magnetic sublayers in contact with the nonmagnetic intermediate sublayer.

In particular, the pinned magnetic layer according to the present invention may have a three-layer structure consisting of the first magnetic sublayer, the second magnetic sublayer, and the nonmagnetic intermediate sublayer between the first magnetic sublayer and the second magnetic sublayer. The nonmagnetic intermediate sublayer made of a material having a lattice constant larger than that of Ru, such as a Ru—X alloy, distorts the crystal structures of the first magnetic sublayer and the second magnetic sublayer from the side in contact with the nonmagnetic intermediate sublayer. This can increase the magnetostriction constants of the first magnetic sublayer and the second magnetic sublayer and the entire magnetostriction constant of all the magnetic sublayers constituting the pinned magnetic layer.

As a result, the magnetization of the pinned magnetic layer is efficiently fixed in the height direction. The distortion or the asymmetry of a reproduced waveform resulting from the magnetization disturbance of the pinned magnetic layer due to the longitudinal bias field caused by a hard bias layer can also be reduced. The inversion of the pinned magnetic layer caused, for example, by ESD can also be reduced. Furthermore, even when the stress changes, the magnetization of the pinned magnetic layer can be kept stable. Thus, a highly reliable magnetoresistive sensor can be provided.

BRIEF DESCRIPTION OF THE DRAWINGS

FIG. 12 is a fragmentary schematic view of a magnetoresistive sensor of a conventional CPP type, viewed from the side opposite to a recording medium.

DESCRIPTION OF THE PREFERRED EMBODIMENTS

Figure 1:
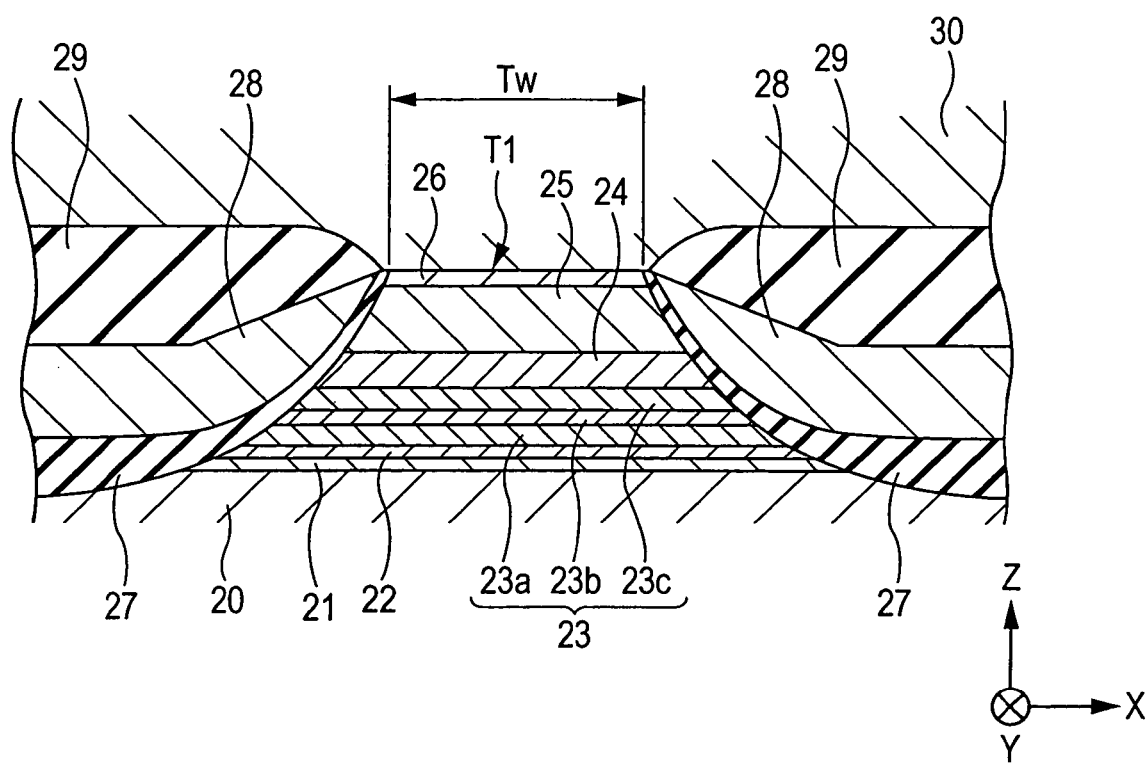
FIG. 1 is a cross-sectional view of the structure of a magnetoresistive sensor according to a first embodiment of the present invention, viewed from the side opposite to a recording medium.
Figure 4:
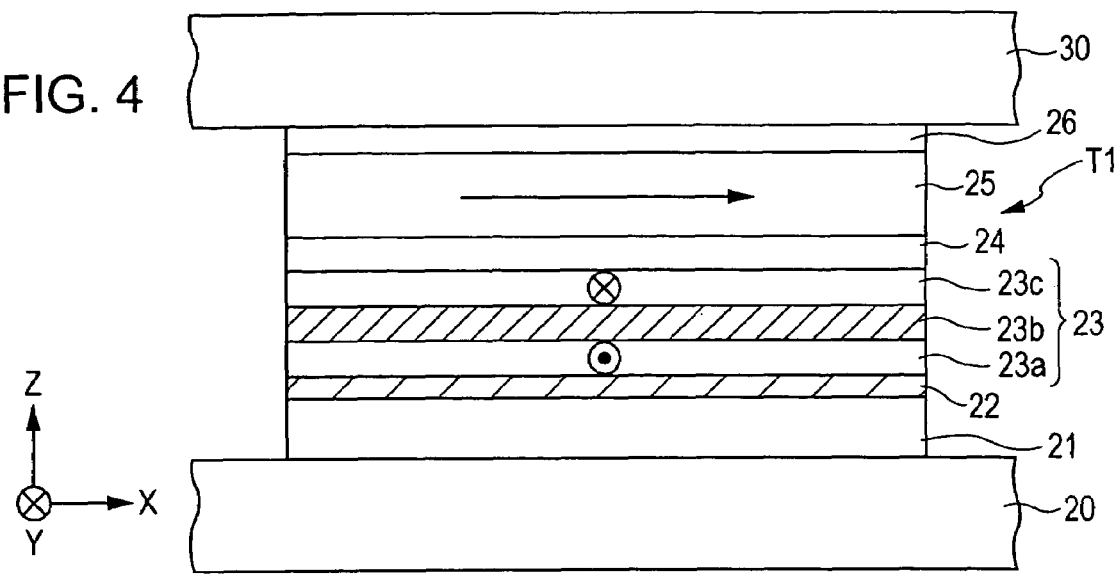
FIG. 4 is a fragmentary schematic view of the magnetoresistive sensor shown in FIG. 1.

FIG. 1 is a cross-sectional view of a magnetoresistive sensor according to a first embodiment of the present invention, viewed from the side opposite to a recording medium. FIG. 4 is a fragmentary schematic view of the magnetoresistive sensor shown in FIG. 1. In FIG. 4, a first magnetostriction-enhancing layer 22 and a nonmagnetic intermediate sublayer 23b, which are the most characteristic components of the present invention, are indicated by hatched lines.

In the magnetoresistive sensor shown in FIGS. 1 and 4, a multilayer film T1 is formed on a lower shielding layer 20 made of a magnetic material.

In the embodiment shown in FIGS. 1 and 4, the multilayer film T1 contains a seed layer 21, the first magnetostriction-enhancing layer 22, a pinned magnetic layer 23, a nonmagnetic material layer 24, a free magnetic layer 25, and a protective layer 26 in this order from the bottom.

The seed layer 21 is composed of a NiFe alloy, a NiFeCr alloy, Cr, or Ta. For example, the seed layer 21 is composed of 60% by atom of (Ni0.8Fe0.2) and 40% by atom of Cr, and has a thickness of 3.5 to 6.0 nm.

The seed layer 21 improves the {111} orientation of the first magnetostriction-enhancing layer 22 made of a nonmagnetic metal.

The first magnetostriction-enhancing layer 22 will be described below.

The pinned magnetic layer 23 has an artificial ferri structure in which the first magnetic sublayer 23a and a second magnetic sublayer 23c are stacked with a nonmagnetic intermediate sublayer 23b interposed therebetween.

The magnetization of the pinned magnetic layer 23 is fixed in the height direction (in the Y direction in FIGS. 1 and 4) owing to the uniaxial anisotropy of the pinned magnetic layer 23.

The nonmagnetic material layer 24 prevents the pinned magnetic layer 23 and the free magnetic layer 25 from magnetically coupling. Preferably, the nonmagnetic material layer 24 is composed of an electrically conductive nonmagnetic material, such as Cu, Cr, Au, or Ag. In particular, Cu is preferred. The nonmagnetic material layer 24 has a thickness of 1.7 to 5.0 nm.

The free magnetic layer 25 is made of a magnetic material, such as a NiFe alloy or a CoFe alloy. In the embodiment shown in FIG. 1, when the free magnetic layer 25 is made of the NiFe alloy, an anti-diffusion layer (not shown) made, for example, of Co or CoFe, is preferably disposed between the free magnetic layer 25 and the nonmagnetic material layer 24. The free magnetic layer 25 has a thickness of 2.0 to 10.0 nm. The free magnetic layer 25 may have an artificial ferri structure that contains a plurality of magnetic sublayers with a nonmagnetic intermediate sublayer interposed therebetween. The track width Tw depends on the width of the free magnetic layer 25 in the direction of the track width (in the X direction in FIGS. 1 and 4).

The protective layer 26 is composed, for example, of Ta or Ru, and prevents the oxidation of the multilayer film T1. The protective layer 26 has a thickness of 1.0 to 5.0 nm.

In the embodiment shown in FIG. 1, a first insulating layer 27, a hard bias layer 28, and a second insulating layer 29 are stacked along the periphery of the seed layer 21 to the protective layer 26 in the multilayer film T1. Owing to the longitudinal bias field of the hard bias layer 28, the magnetization of the free magnetic layer 25 is oriented in the direction of the track width (in the X direction in FIG. 1).

A bias base layer (not shown) may be disposed between the first insulating layer 27 and the hard bias layer 28. The bias base layer is composed, for example, of Cr, W, a W—Ti alloy, or an Fe—Cr alloy.

The first insulating layer 27 and the second insulating layer 29 are made of an insulating material, such as $Al_2O_3$ or $SiO_2$, and insulate the top and the bottom of the hard bias layer 28 to prevent the electric current flowing through the multilayer film T1 in the direction perpendicular to the interfaces between each layer from shunting in the direction of the track width of the multilayer film T1.

The hard bias layers 28, 28 are made, for example, of a Co—Pt (cobalt-platinum) alloy or a Co—Cr—Pt (cobalt-chromium-platinum) alloy.

An upper shielding layer 30 made of a magnetic material is disposed on the second insulating layer 29 and the protective layer 26. The magnetoresistive sensor shown in FIGS. 1 and 4 has a current perpendicular to the plane (CPP) structure. The lower shielding layer 20 and the upper shielding layer 30 function as electrodes and serve as a current source that applies an electric current in the direction perpendicular to the interfaces between each layer constituting the multilayer film T1.

Owing to the longitudinal bias field of the hard bias layers 28, 28, the magnetization of the free magnetic layer 25 is oriented in the direction of the track width (in the X direction in FIG. 1). Thus, the magnetization of the free magnetic layer 25 sensitively varies in response to a signal magnetic field (external magnetic field) from the recording medium. On the other hand, the magnetization of the pinned magnetic layer 23 is fixed in the height direction (in the Y direction in FIGS. 1 and 4).

The variations in the direction of magnetization of the free magnetic layer 25 relative to the direction of the fixed magnetization of the pinned magnetic layer 23 (in particular, the direction of the fixed magnetization of the second magnetic sublayer 23c) cause variations in the electrical resistance. The variations in the voltage or the electric current caused by the variations in the electrical resistance allow the detection of the leakage field from the recording medium.

The characteristic components of the present embodiment will be described below.

In the magnetoresistive sensor shown in FIGS. 1 and 4, the magnetoelastic effect that imparts the uniaxial anisotropy to the pinned magnetic layer 23 is principally used to fix the magnetization of the pinned magnetic layer 23.

The magnetoelastic effect depends on the magnetoelastic energy. The magnetoelastic energy is defined by the stress α on the pinned magnetic layer 23 and the magnetostriction constant λs of the pinned magnetic layer 23.

Figure 2:
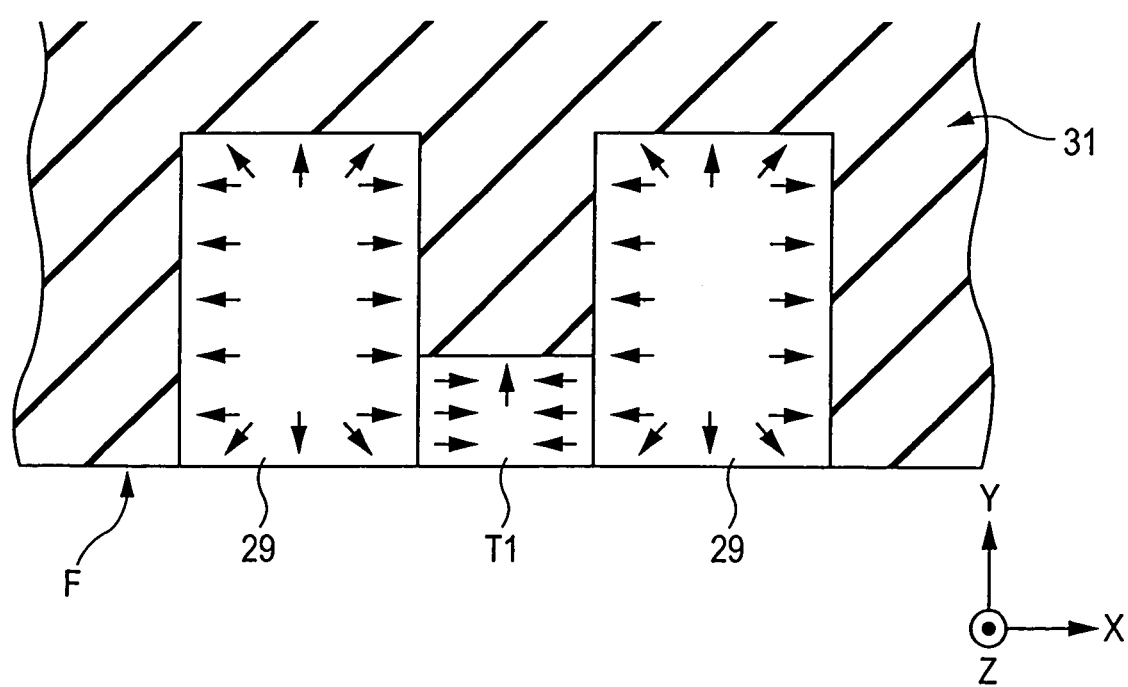
FIG. 2 is a plan view of the magnetoresistive sensor shown in FIG. 1.

FIG. 2 is a plan view of the magnetoresistive sensor shown in FIG. 1, viewed from the top of the FIG. 1 (in the direction opposite to the Z direction in FIG. 1). The multilayer film T1 of the magnetoresistive sensor is sandwiched between a pair of the first insulating layers 27, 27, the hard bias layers 28, 28, and the second insulating layers 29, 29. The first insulating layers 27, 27 and the hard bias layers 28, 28 underlie the second insulating layers 29, 29, and are not shown in FIG. 2. The multilayer film T1, the first insulating layers 27, 27, the hard bias layers 28, 28, and the second insulating layers 29, 29 are surrounded by the third insulating layer 31 indicated by hatched lines.

An open end face F of the multilayer film T1, the first insulating layers 27, 27, the hard bias layers 28, 28, and the second insulating layers 29, 29 opposite to the recording medium is bare or is coated with a thin protective layer, for example, of diamond-like carbon (DLC) having a thickness of about 2.0 to 5.0 nm.

A two-dimensionally isotropic stress from the lower shielding layer 20 and the upper shielding layer 30 becomes asymmetric in the vicinity of the open end face F. Thus, the multilayer film T1 is under a tensile stress in the direction parallel to the height direction (the Y direction in FIG. 2). When the laminate of the first insulating layers 27, 27, the hard bias layers 28, 28, and the second insulating layers 29, 29 has a compressive internal stress, these layers tend to expand in two dimensions. Thus, the multilayer film T1 is under a compressive stress in the directions parallel to and antiparallel to the direction of the track width (the X direction in FIG. 2).

Thus, the pinned magnetic layer 23 having the open end face F at the side opposite to the recording medium is exposed to the tensile stress in the height direction (in the Y direction in FIG. 2) and the compressive stress in the direction of the track width (in the X direction in FIG. 2). Since the first magnetic sublayer 23a and the second magnetic sublayer 23c are made of the magnetic material having a positive magnetostriction constant λs, the axes of easy magnetization of the first magnetic sublayer 23a and the second magnetic sublayer 23c are directed parallel to the depth direction (in the height direction; in the Y direction in FIG. 2) of the magnetoresistive sensor owing to the magnetoelastic effect. Thus, the magnetizations of the first magnetic sublayer 23a and the second magnetic sublayer 23c are fixed parallel or antiparallel to the height direction. Antiparallel coupling caused by the RKKY interaction acts between the first magnetic sublayer 23a and the second magnetic sublayer 23c. Thus, the magnetization of the first magnetic sublayer 23a is fixed antiparallel to the magnetization of the second magnetic sublayer 23c.

According to the present invention, the magnetoelastic energy is increased by increasing the magnetostriction constant λs of the pinned magnetic layer 23. The large magnetoelastic energy results in large uniaxial anisotropy of the pinned magnetic layer 23. The large uniaxial anisotropy of the pinned magnetic layer 23 allows the magnetization of the pinned magnetic layer 23 to be fixed firmly and unidirectionally. This increases the output of the magnetoresistive sensor and improves the stability and the symmetry of the output.

A structure capable of increasing the magnetostriction constant λs of the pinned magnetic layer 23 will be described below. The first magnetic sublayer 23a in the pinned magnetic layer 23 of the magnetoresistive sensor shown in FIGS. 1 and 4 is the farthest of the magnetic sublayers constituting the pinned magnetic layer 23 from the nonmagnetic material layer 24. The opposite side of the first magnetic sublayer 23a to the nonmagnetic material layer 24 is in contact with the first magnetostriction-enhancing layer 22 made of a nonmagnetic metal. This causes distortion in the crystal structure particularly on the bottom side of the first magnetic sublayer 23a and thereby increases the magnetostriction constant λs of the first magnetic sublayer 23a.

In the embodiment shown in FIGS. 1 and 4, the nonmagnetic intermediate sublayer 23b is made of a nonmagnetic material having a lattice constant larger than that of Ru.

Conventionally, the nonmagnetic intermediate sublayer typically has had a monolayer structure of Ru, because the monolayer structure of Ru increased the antiparallel coupling caused by the RKKY interaction between the first magnetic sublayer 23a and the second magnetic sublayer 23c and improved the thermal stability of the antiparallel coupling caused by the RKKY interaction.

However, the lattice constant of the nonmagnetic intermediate sublayer made of Ru was similar to the lattice constant of the first magnetic sublayer 23a or the second magnetic sublayer 23c (a mismatch value described below was about 8%). Thus, the crystal structures of the top surface of the first magnetic sublayer 23a and the bottom surface of the second magnetic sublayer 23c each in contact with the nonmagnetic intermediate sublayer made of Ru could not be largely distorted. Thus, the magnetostriction-enhancing effect of the nonmagnetic intermediate sublayer made of Ru was not so strong as that of the first magnetostriction-enhancing layer 22. Furthermore, since the nonmagnetic intermediate sublayer was as thin as 0.7 to 0.9 nm, even when the lattice mismatch occurred, the nonmagnetic intermediate sublayer tended to be predominantly transformed and had a large lattice strain. Thus, the lattice strains of the magnetic sublayers could not be increased. Thus, relatively large mismatch was desired.

In the present invention, the nonmagnetic intermediate sublayer 23b is made of a nonmagnetic material having a lattice constant larger than that of Ru. Thus, the crystal structure of the top surface of the first magnetic sublayer 23a in contact with the bottom surface of the nonmagnetic intermediate sublayer 23b, and the bottom surface of the second magnetic sublayer 23c is appropriately distorted. In this way, the present invention provides a structure in which the magnetostrictions of both the first magnetic sublayer 23a and the second magnetic sublayer 23c can be increased.

Preferably, all of the first magnetostriction-enhancing layer 22, the nonmagnetic intermediate sublayer 23b, the first magnetic sublayer 23a, and the second magnetic sublayer 23c have a face-centered cubic lattice (fcc) structure and show the preferred orientation of an equivalent crystal face represented by a {111} face in the direction parallel to the interface. This improves the crystallinity. The nonmagnetic intermediate sublayer 23b may have a hexagonal close-packed (hcp) structure. In this case, C face ({0001} face) should be the preferred orientation. The {0001} face of the hcp structure is a closest packed face and has the same atomic arrangement as the {111} face of the fcc structure.

In the above case, a value of the difference between the nearest-neighbor distance in the {111} face of the first magnetostriction-enhancing layer 22 and the nearest-neighbor distance in the {111} face of the first magnetic sublayer 23a in the pinned magnetic layer 23, divided by the nearest-neighbor distance in the {111} face of the first magnetic sublayer 23a (mismatch value), a value of the difference between the nearest-neighbor distance in the {111} face of the nonmagnetic intermediate sublayer 23b (for the hcp structure, the nearest-neighbor distance in the {0001} face) and the nearest-neighbor distance in the {111} face of the first magnetic sublayer 23a, divided by the nearest-neighbor distance in the {111} face of the first magnetic sublayer 23a (mismatch value), and a value of the difference between the nearest-neighbor distance in the {111} face of the nonmagnetic intermediate sublayer 23b (for the hcp structure, the nearest-neighbor distance in the {0001} face) and the nearest-neighbor distance in the {111} face of the second magnetic sublayer 23c, divided by the nearest-neighbor distance in the {111} face of the second magnetic sublayer 23c (mismatch value) are preferably from 0.05 to 0.20.

Figure 3:
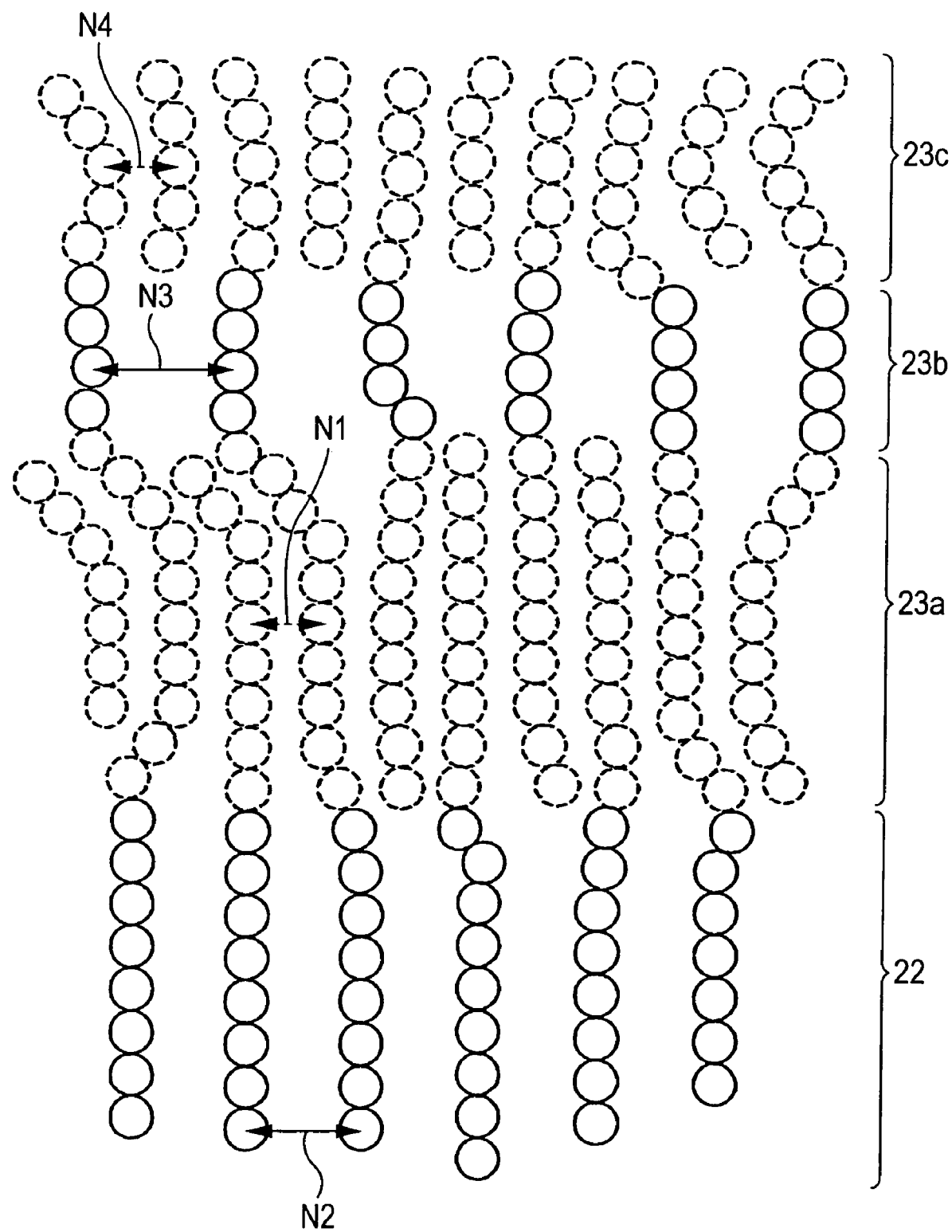
FIG. 3 is a schematic view showing a state in which a distortion occurs while a magnetostriction-enhancing layer and a nonmagnetic intermediate sublayer are aligned with a pinned magnetic layer.

In the magnetoresistive sensor according to the present embodiment, as schematically shown in FIG. 3, atoms constituting the first magnetostriction-enhancing layer 22 and atoms in the bottom surface side of the first magnetic sublayer 23a, atoms constituting the nonmagnetic intermediate sublayer 23b and atoms in the top surface side of the first magnetic sublayer 23a, and atoms constituting the nonmagnetic intermediate sublayer 23b and atoms in the bottom surface side of the second magnetic sublayer 23c overlap one another, while distortion occurs in the crystal structures near their interfaces.

In FIG. 3, the nearest-neighbor distance N1 in the {111} face of the first magnetic sublayer 23a, the nearest-neighbor distance N2 in the {111} face of the first magnetostriction-enhancing layer 22, the nearest-neighbor distance N3 in the fcc {111} face or in the hcp {0001} face of the nonmagnetic intermediate sublayer 23b, and the nearest-neighbor distance. N4 in the {111} face of the second magnetic sublayer 23c are determined at positions which are away from the interface between the first magnetostriction-enhancing layer 22 and the first magnetic sublayer 23a, the interface between the nonmagnetic intermediate sublayer 23b and the first magnetic sublayer 23a, and the interface between the nonmagnetic intermediate sublayer 23b and the second magnetic sublayer 23c, and are not susceptible to the distortion.

As shown in FIG. 3, at least part of crystals in the first magnetostriction-enhancing layer 22 and in the bottom surface side of the first magnetic sublayer 23a, at least part of crystals in the nonmagnetic intermediate sublayer 23b and in the top surface side of the first magnetic sublayer 23a, and at least part of crystals in the nonmagnetic intermediate sublayer 23b and in the bottom surface side of the second magnetic sublayer 23c grow in an epitaxial state. As a result, distortion occurs at least in the crystal structures near the top surface and the bottom surface of the first magnetic sublayer 23a and at least in the crystal structures near the bottom surface of the second magnetic sublayer 23c. This can increase the magnetostriction constants $\lambda$s of the first magnetic sublayer 23a and the second magnetic sublayer 23c.

In the present invention, most of the atoms constituting the first magnetic sublayer 23a and the atoms constituting the first magnetostriction-enhancing layer 22 in the vicinity of the interface between the first magnetic sublayer 23a and the first magnetostriction-enhancing layer 22, most of the atoms constituting the first magnetic sublayer 23a and the atoms constituting the nonmagnetic intermediate sublayer 23b in the vicinity of the interface between the first magnetic sublayer 23a and the nonmagnetic intermediate sublayer 23b, and most of the atoms constituting the second magnetic sublayer 23c and the atoms constituting the nonmagnetic intermediate sublayer 23b in the vicinity of the interface between the second magnetic sublayer 23c and the nonmagnetic intermediate sublayer 23b may be aligned and overlap one another. For example, as schematically shown in FIG. 3, there may be some areas where atoms constituting the first magnetic sublayer 23a do not overlap with atoms constituting the first magnetostriction-enhancing layer 22, and where atoms constituting the first magnetic sublayer 23a and the second magnetic sublayer 23c do not overlap with atoms constituting the nonmagnetic intermediate sublayer 23b. A few crystal grains constituting the polycrystal may be in a nonepitaxial state and not be aligned.

The large magnetostriction constants of the first magnetic sublayer 23a and the second magnetic sublayer 23c in the pinned magnetic layer 23 allow the efficient pinning of magnetization of the pinned magnetic layer 23 in the height direction. The large magnetostriction constants can also reduce the distortion or the asymmetry of a reproduced waveform resulting from the magnetization disturbance of the pinned magnetic layer 23 due to the longitudinal bias field caused by the hard bias layer. The large magnetostriction constants can also prevent the inversion of the pinned magnetic layer 23 caused, for example, by ESD. Furthermore, even when the stress changes, the large magnetostriction constants allow the pinned magnetic layer 23 to be magnetized stably, providing a highly reliable magnetoresistive sensor.

In the magnetoresistive sensor shown in FIGS. 1 and 4, the nonmagnetic intermediate sublayer 23b is required to not only have the magnetostriction-enhancing effect on the first magnetic sublayer 23a and the second magnetic sublayer 23c, but also generate strong antiparallel coupling between the first magnetic sublayer 23a and the second magnetic sublayer 23c due to the RKKY interaction, thus magnetizing the first magnetic sublayer 23a and the second magnetic sublayer 23c in an antiparallel state. The antiparallel coupling caused by the RKKY interaction must be thermally stable.

Preferably, the nonmagnetic intermediate sublayer 23b according to the present invention is made of a Ru—X alloy, wherein the element X is selected from the group consisting of Re, Ir, Os, and Rh, or a combination thereof. Preferably, the Ru content is at least 50% by atom. The X element itself can generate relatively strong antiparallel coupling between the first magnetic sublayer 23a and the second magnetic sublayer 23c due to the RKKY interaction. However, the X element is thermally unstable and causes interdiffusion between the first magnetic sublayer 23a and the second magnetic sublayer 23c, for example, at a temperature of about 250° C., which is required to manufacture a magnetic head. Thus, the magnetizations of the first magnetic sublayer 23a and the second magnetic sublayer 23c cannot be appropriately maintained antiparallel to each other.

Preferably, the Ru content in the Ru—X alloy is 95% by atom or less. When the Ru content is more than 95% by atom or the X element content is less than 5% by atom, the effect of increasing the lattice constant by the addition of the X element is too small to adjust the mismatch value between 0.08 and 0.20.

Thus, the nonmagnetic intermediate sublayer 23$b$ is preferably based on Ru. The nonmagnetic intermediate sublayer 23$b$ made of the Ru—X alloy should have a thickness such that the antiparallel coupling caused by the RKKY interaction between the first magnetic sublayer 23$a$ and the second magnetic sublayer 23$c$ reaches the maximum. When the Ru content is in the range of 50% to 95% by atom (the remainder is the element X), the nonmagnetic intermediate sublayer 23$b$ having a thickness of 0.5 to 1.0 nm can appropriately enhance the antiparallel coupling caused by the RKKY interaction.

It is reasonable for the nonmagnetic intermediate sublayer 23$b$ made of the Ru—X alloy to have a larger lattice constant than the magnetic material constituting the first magnetic sublayer 23$a$ and the second magnetic sublayer 23$c$.

The first magnetic sublayer 23$a$ and the second magnetic sublayer 23$c$ are composed of Co, CoFe, Co-Z, CoFe-Z (wherein Z is selected from the group consisting of Ti, Zr, Ta, Hf, Sc, V, Mn, Y, and Nb, or a mixture thereof), Ni-Q (wherein Q is selected from the group consisting of Rh, Ir, Be, Al, Si, Ga, Ge, Ti, Mn, Zn, Cd, and Sn, or a mixture thereof), or a Heusler alloy having a composition formula of $CO_2MnY$ (wherein Y is selected from the group consisting of Al, Si, Ga, Ge, and Sn, or a mixture thereof).

The nonmagnetic intermediate sublayer 23$b$ made of the Ru—X alloy has a larger lattice constant than the first magnetic sublayer 23$a$ and the second magnetic sublayer 23$c$ made of the material described above. Specifically, the mismatch value between the first magnetic sublayer 23$a$ and the second magnetic sublayer 23$c$ can be adjusted in the range of 0.08 to 0.20.

In the magnetoresistive sensor of the CPP type shown in FIGS. 1 and 4, spin-dependent bulk scattering plays a very important role in the GMR effect. Thus, the spin-dependent bulk scattering coefficient (β value) of the second magnetic sublayer 23$c$, which contributes to the GMR effect, is preferably positive. According to the present invention, the second magnetic sublayer 23$c$ made of the material described above has a positive spin-dependent bulk scattering coefficient (β value).

Furthermore, the spin-dependent bulk scattering coefficient (β value) has a relationship expressed by $\rho\downarrow/\rho\uparrow=(1+\beta)/(1-\beta)$, wherein $\rho\downarrow$ is a specific resistance of a down-spin conduction electron, $\rho\uparrow$ is a specific resistance of an up-spin conduction electron.

When the spin-dependent bulk scattering coefficient (β value) is positive, $\rho\downarrow/\rho\uparrow$ is greater than 1. That is, $\rho\downarrow$ is larger than $\rho\uparrow$. Thus, the down-spin conduction electron hardly passes through or is blocked in a ferromagnetic layer and accordingly the mean free path and the spin diffusion length of the down-spin conduction electron decrease (exhibiting insulating behavior). On the other hand, the up-spin conduction electron easily passes through the ferromagnetic layer and accordingly the mean free path and the spin diffusion length of the up-spin conduction electron increase (exhibiting metallic behavior). Thus, the differences in the mean free path and the spin diffusion length between the up-spin conduction electron and the down-spin conduction electron increase.

In the magnetoresistive sensor of the CPP type, resistance change per unit area (ΔR·A), which is important to improve the GMR effect, is positively correlated with the difference in the spin diffusion length between the up-spin conduction electron and the down-spin conduction electron. Thus, use of a magnetic material having a positive large spin-dependent bulk scattering coefficient (β value) for the second magnetic sublayer 23$c$ increases the difference in the spin diffusion length between the up-spin conduction electron and the down-spin conduction electron. This increases the resistance change per unit area (ΔR·A) and allows the production of the magnetoresistive sensor that appropriately supports higher recording density.

Figure 7:
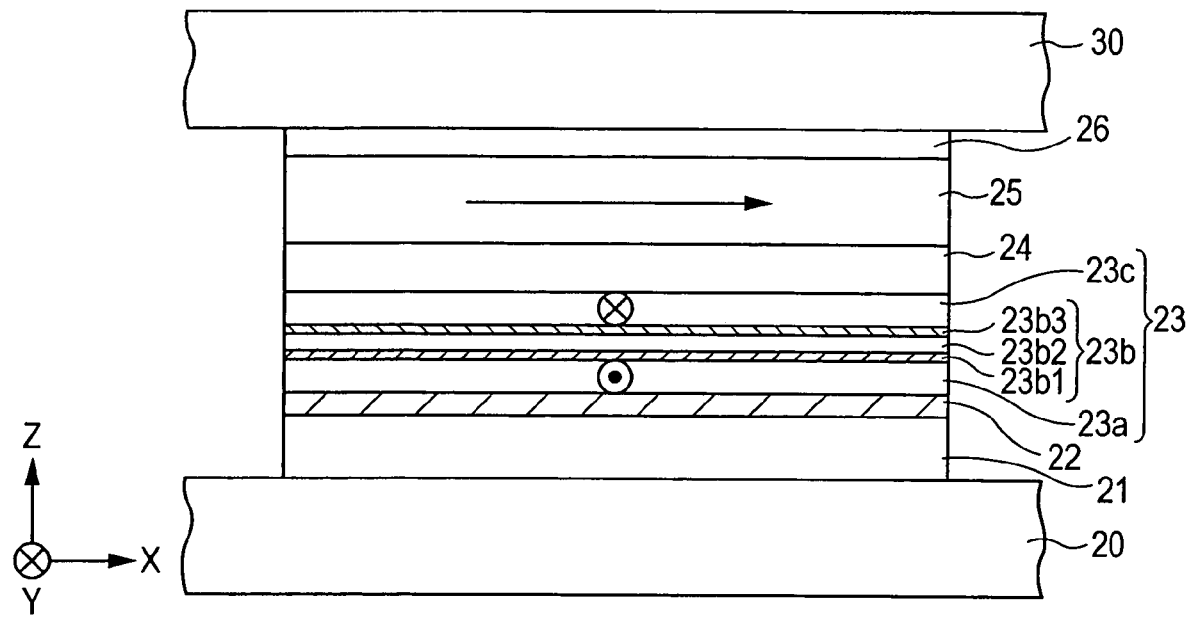
FIG. 7 is a fragmentary schematic view of the structure of a magnetoresistive sensor according to another embodiment of the present invention, viewed from the side opposite to a recording medium.
Figure 8:
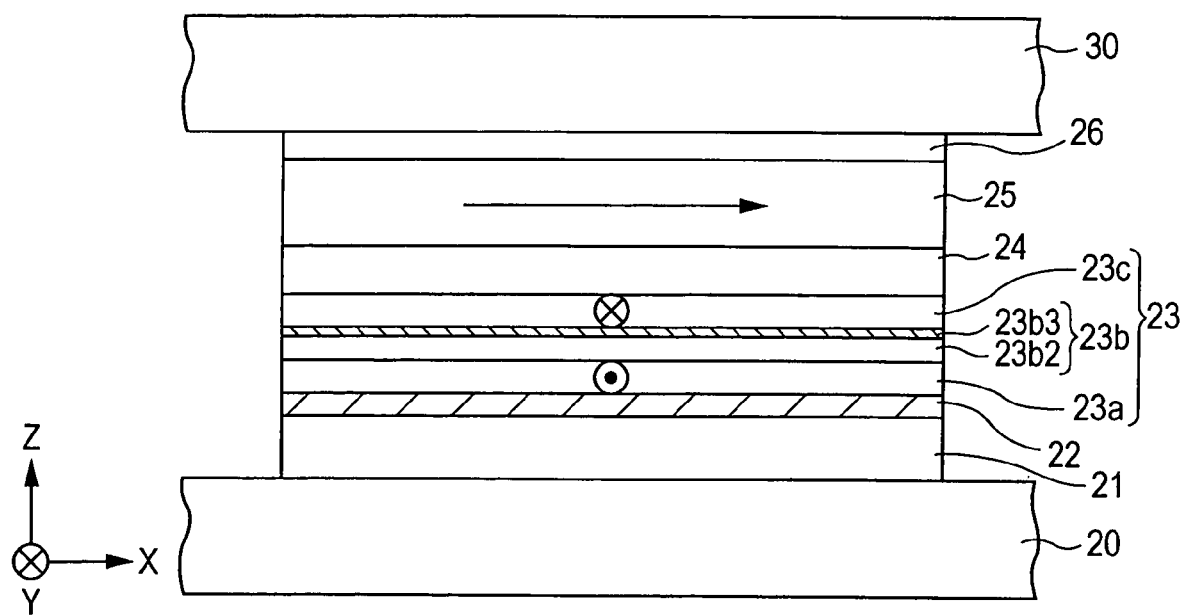
FIG. 8 is a fragmentary schematic view of the structure of a magnetoresistive sensor according to another embodiment of the present invention, viewed from the side opposite to a recording medium.

In the magnetoresistive sensor shown in FIGS. 1 and 4, while the whole nonmagnetic intermediate sublayer 23$b$ is made of the Ru—X alloy having a lattice constant larger than that of Ru, another structure shown in FIG. 7 or 8 can be provided according to the present invention.

FIGS. 7 and 8 are fragmentary cross-sectional schematic views of the magnetoresistive sensors, viewed from the side opposite to a recording medium.

The magnetoresistive sensors shown in FIGS. 7 and 8 have different nonmagnetic intermediate sublayers 23$b$ in the pinned magnetic layers 23 from that in the magnetoresistive sensor shown in FIGS. 1 and 4.

In the embodiment shown in FIG. 7, the nonmagnetic intermediate sublayer 23$b$ in the pinned magnetic layer 23 has a laminated structure consisting of a Ru subsublayer 23$b$2 composed of Ru, a second magnetostriction-enhancing subsublayer 23$b$3 having a lattice constant larger than that of Ru in the top surface side of the Ru subsublayer 23$b$2, and a third magnetostriction-enhancing subsublayer 23$b$1 having a lattice constant larger than that of Ru in the bottom surface side of the Ru subsublayer 23$b$2.

Preferably, the second magnetostriction-enhancing subsublayer 23$b$3 and the third magnetostriction-enhancing subsublayer 23$b$1 are composed of one element selected from the group consisting of Re, Ir, Os, and Rh, or a mixture thereof. The magnetostriction-enhancing subsublayers composed of the element or the elements have larger lattice constants than the Ru subsublayer 23$b$2.

The magnetostriction-enhancing effect of the nonmagnetic intermediate sublayer 23$b$ on the first magnetic sublayer 23$a$ and the second magnetic sublayer 23$c$ is particularly large at the interfaces with the first magnetic sublayer 23$a$ and the second magnetic sublayer 23$c$. Thus, preferably, the second magnetostriction-enhancing subsublayer 23$b$3 and the third magnetostriction-enhancing subsublayer 23$b$1 each having a lattice constant larger than that of Ru are provided on the top surface and the bottom surface of the nonmagnetic intermediate sublayer 23$b$, respectively, and the first magnetic sublayer 23$a$ and the second magnetic sublayer 23$c$ are in contact with the magnetostriction-enhancing subsublayers 23$b$1 and 23$b$3, respectively.

Even when the whole nonmagnetic intermediate sublayer 23$b$ is composed of one element selected from the group consisting of Re, Ir, Os, and Rh, or a mixture thereof, relatively strong antiparallel coupling between the first magnetic sublayer 23$a$ and the second magnetic sublayer 23$c$ due to the RKKY interaction can be generated. However, the antiparallel coupling caused by the RKKY interaction may be thermally unstable, and the antiparallel magnetization between the first magnetic sublayer 23$a$ and the second magnetic sublayer 23$c$ may be deteriorated at a temperature used. Thus, the Ru subsublayer 23$b$2, which provides thermally stable antiparallel coupling caused by the RKKY interaction, is preferably provided as an intermediate subsublayer in the nonmagnetic intermediate sublayer 23$b$.

Preferably, the second magnetostriction-enhancing subsublayer 23b3 and the third magnetostriction-enhancing subsublayer 23b1 have smaller thicknesses than the Ru subsublayer 23b2. To improve the thermal stability of the antiparallel coupling caused by the RKKY interaction, the nonmagnetic intermediate sublayer 23b should be based on the Ru subsublayer 23b2. Even the additional very thin second magnetostriction-enhancing subsublayer 23b3 and very thin third magnetostriction-enhancing subsublayer 23b1 on the top surface and the bottom surface of the Ru subsublayer 23b2 can increase the magnetostriction-enhancing effect on the first magnetic sublayer 23a and the second magnetic sublayer 23c.

Preferably, the second magnetostriction-enhancing subsublayer 23b3 and the third magnetostriction-enhancing subsublayer 23b1 have thicknesses of 0.1 to 0.5 nm.

The nonmagnetic intermediate sublayer 23b having the laminated structure of the third magnetostriction-enhancing subsublayer 23b1/the Ru subsublayer 23b2/the second magnetostriction-enhancing subsublayer 23b3 should have a thickness such that the antiparallel coupling caused by the RKKY interaction between the first magnetic sublayer 23a and the second magnetic sublayer 23c reaches the maximum. Preferably, the nonmagnetic intermediate sublayer 23b having the laminated structure of the third magnetostriction-enhancing subsublayer 23b1/the Ru subsublayer 23b2/the second magnetostriction-enhancing subsublayer 23b3 has a thickness of 0.5 to 1.0 nm.

In the magnetoresistive sensor shown in FIG. 8, the nonmagnetic intermediate sublayer 23b has a two-layer structure consisting of the Ru subsublayer 23b2 and the second magnetostriction-enhancing subsublayer 23b3. The second magnetostriction-enhancing subsublayer 23b3 is in contact with the second magnetic sublayer 23c, and thereby can increase the magnetostriction of the second magnetic sublayer 23c.

As already explained, the bottom surface of the first magnetic sublayer 23a is in contact with the first magnetostriction-enhancing layer 22. The magnetostriction-enhancing effect of the first magnetostriction-enhancing layer 22 distorts at least part of the crystal structure of the first magnetic sublayer 23a, increasing the magnetostriction of the first magnetic sublayer 23a.

In this way, the magnetostriction of the first magnetic sublayer 23a can be increased at least by the magnetostriction-enhancing effect of the first magnetostriction-enhancing layer 22. On the other hand, since the second magnetic sublayer 23c is away from the first magnetostriction-enhancing layer 22, the magnetostriction-enhancing effect of the first magnetostriction-enhancing layer 22 on the second magnetic sublayer 23c is small. Thus, to modify the layer structure of the nonmagnetic intermediate sublayer 23b, at least the second magnetostriction-enhancing subsublayer 23b3 is preferably disposed between the Ru subsublayer 23b2 and the second magnetic sublayer 23c to increase the magnetostriction of the second magnetic sublayer 23c.

The nonmagnetic intermediate sublayer 23b having the laminated structure of the Ru subsublayer 23b2/the second magnetostriction-enhancing subsublayer 23b3 should have a thickness such that the antiparallel coupling caused by the RKKY interaction between the first magnetic sublayer 23a and the second magnetic sublayer 23c reaches the maximum. Preferably, the nonmagnetic intermediate sublayer 23b having the laminated structure of the Ru subsublayer 23b2/the second magnetostriction-enhancing subsublayer 23b3 has a thickness of 0.5 to 1.0 nm.

The material of the first magnetostriction-enhancing layer 22 will be described below. The first magnetostriction-enhancing layer 22 must be a nonmagnetic metal that has a lattice constant larger than that of the first magnetic sublayer 23a. The Ru—X alloys used in the nonmagnetic intermediate sublayer 23b, the second magnetostriction-enhancing subsublayer 23b3, and the third magnetostriction-enhancing subsublayer 23b1 should be made of materials that increase the antiparallel coupling caused by the RKKY interaction between the first magnetic sublayer 23a and the second magnetic sublayer 23c as much as possible (not as much as Ru).

On the other hand, the material of the first magnetostriction-enhancing layer 22 is free from such constraints and is more arbitrarily selected than those of the second magnetostriction-enhancing subsublayer 23b3 and the third magnetostriction-enhancing subsublayer 23b1.

For example, the first magnetostriction-enhancing layer 22 may be composed of an element, such as Pt, Au, Pd, Ag, Ir, Rh, Ru, Re, Mo, or W, or an alloy thereof, or an R—Mn alloy, wherein the element R is selected from the group consisting of Pt, Pd, Ir, Rh, Ru, Os, Ni, and Fe, or a mixture thereof.

The first magnetostriction-enhancing layer 22 has a thickness of 0.5 to 5.0 nm.

As long as the thickness of the first magnetostriction-enhancing layer 22 made of the R—Mn (wherein the element R is selected from the group consisting of Pt, Pd, Ir, Rh, Ru, Os, Ni, and Fe, or a mixture thereof) is in this range, the first magnetostriction-enhancing layer 22 maintains the initial face-centered cubic (fcc) structure. When the first magnetostriction-enhancing layer 22 has a thickness greater than 5.0 nm, the crystal structure of the first magnetostriction-enhancing layer 22 undesirably transforms into a CuAuI type ordered, face-centered tetragonal (fct) structure at a temperature of 250° C. or more. However, even when the first magnetostriction-enhancing layer 22 has a thickness greater than 5.0 nm, the first magnetostriction-enhancing layer 22 maintains the initial face-centered cubic (fcc) structure at a temperature below 250° C.

When the first magnetostriction-enhancing layer 22 is made of the R—Mn alloy, the content of the R element in the R—Mn alloy is preferably in the range of 45% to 99% by atom. When the content of the R element is in this range, the magnetostriction of the first magnetic sublayer 23a has a large consistent value.

Preferably, the first magnetostriction-enhancing layer 22, the nonmagnetic intermediate sublayer 23b made of the Ru—X alloy shown in FIG. 1, and the second magnetostriction-enhancing subsublayer 23b3 and the third magnetostriction-enhancing subsublayer 23b1 shown in FIGS. 7 and 8 have the face-centered cubic (fcc) structure or the hexagonal close-packed (hcp) structure entirely or in the vicinity of the interfaces with the first magnetic sublayer 23a and the second magnetic sublayer 23c, and show the preferred orientation of an equivalent crystal face represented by the {111} face for the fcc structure and the {0001} face for the hcp structure in the direction parallel to the interface.

On the other hand, the first magnetic sublayer 23a and the second magnetic sublayer 23c preferably have the face-centered cubic (fcc) structure entirely or in the vicinity of the interfaces with the first magnetostriction-enhancing layer 22, the nonmagnetic intermediate sublayer 23b made of the Ru—X alloy shown in FIG. 1, and the second magnetostriction-enhancing subsublayer 23b3 and the third magnetostriction-enhancing subsublayer 23b1 shown in FIGS. 7 and 8, and preferably show the preferred orientation of an equivalent crystal face represented by the {111} face in the direction parallel to the interface.

Under such a crystal orientation, the atoms constituting the first magnetic sublayer 23a and the second magnetic sublayer 23c easily overlap with the atoms constituting the first magnetostriction-enhancing layer 22, the atoms constituting the nonmagnetic intermediate sublayer 23b made of the Ru—X alloy shown in FIG. 1, and the atoms constituting the second magnetostriction-enhancing subsublayer 23b3 and the third magnetostriction-enhancing subsublayer 23b1 shown in FIGS. 7 and 8. Thus, the crystals easily grow in the epitaxial state as shown in FIG. 3.

According to the present invention, the first magnetic sublayer 23a and the second magnetic sublayer 23c may have the body-centered cubic lattice (bcc) structure entirely or in the vicinity of the interfaces with the first magnetostriction-enhancing layer 22, the nonmagnetic intermediate sublayer 23b made of the Ru—X alloy shown in FIG. 1, and the second magnetostriction-enhancing subsublayer 23b3 and the third magnetostriction-enhancing subsublayer 23b1 shown in FIGS. 7 and 8, and may show the preferred orientation of an equivalent crystal face represented by a {110} face in the direction parallel to the interface.

In such a case, the first magnetostriction-enhancing layer 22, the nonmagnetic intermediate sublayer 23b made of the Ru—X alloy shown in FIG. 1, the second magnetostriction-enhancing subsublayer 23b3 and the third magnetostriction-enhancing subsublayer 23b1 shown in FIGS. 7 and 8 preferably have the face-centered cubic (fcc) structure or the hexagonal close-packed (hcp) structure entirely or in the vicinity of the interfaces with the first magnetic sublayer 23a and the second magnetic sublayer 23c, and preferably show the preferred orientation of an equivalent crystal face represented by the {111} face for the fcc structure and the {0001} face for the hcp structure in the direction parallel to the interface.

The atomic arrangement in the equivalent crystal face represented by the {110} face of the crystal having the bcc structure is similar to the atomic arrangements in the equivalent crystal face represented by the {111} face of the crystal having the fcc structure and the {0001} face of the crystal having the hcp structure. Thus, the crystal having the bcc structure and the crystal having the fcc structure or the hcp structure can be in a heteroepitaxial state, in which the atoms overlap one another.

In the present invention, unlike the structure shown in FIG. 8, the nonmagnetic intermediate sublayer 23b may be composed of two layers: the Ru subsublayer 23b2 and the third magnetostriction-enhancing subsublayer 23b1 between the Ru subsublayer 23b2 and the first magnetic sublayer 23a.

The pinned magnetic layer 23 according to the present invention may have a multilayer structure that is composed of three or more magnetic layers and corresponding two of more nonmagnetic intermediate sublayers 23b. In such a case, the lattice constant of at least the top surface and/or the bottom surface of at least one of the nonmagnetic intermediate sublayers 23b is larger than that of Ru. Furthermore, it is desirable that the second magnetic sublayer 23c, which is the closest to the nonmagnetic material layer 24 or the farthest from the first magnetostriction-enhancing layer 22 of the magnetic sublayers constituting the pinned magnetic layer 23 and is least affected by the magnetostriction-enhancing effect of the first magnetostriction-enhancing layer 22, and the nonmagnetic intermediate sublayer 23b in contact with the second magnetic sublayer 23c at least have the structure as shown in FIGS. 1 and 4, FIG. 7, or FIG. 8, and thus the magnetostriction of the second magnetic sublayer 23c is increased by the magnetostriction-enhancing effect of the nonmagnetic intermediate sublayer 23b.

Figure 5:
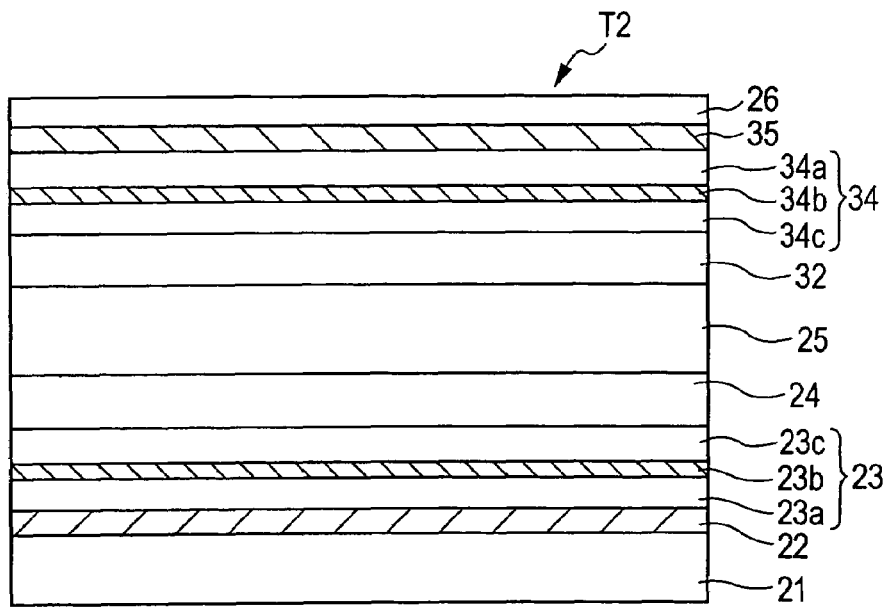
FIG. 5 is a fragmentary schematic view of the structure of a magnetoresistive sensor according to another embodiment of the present invention, viewed from the side opposite to a recording medium.

FIG. 5 is a schematic view of a multilayer structure T2 different from the multilayer structure T1 in the magnetoresistive sensor of the CPP type shown in FIG. 1. The structure shown in FIG. 5 is the structure of a dual spin-valve thin film device. This structure has a central free magnetic layer 25 between nonmagnetic material layers 24 and 32. Under the nonmagnetic material layer 24 is disposed a pinned magnetic layer 23 having an artificial ferri structure that contains a first magnetic sublayer 23a, a nonmagnetic intermediate sublayer 23b, and a second magnetic sublayer 23c. On the nonmagnetic material layer 32 is disposed a pinned magnetic layer 34 having an artificial ferri structure that contains a second magnetic sublayer 34c, a nonmagnetic intermediate sublayer 34b, and a first magnetic sublayer 34a. Under the pinned magnetic layer 23 is disposed an lower first magnetostriction-enhancing layer 22. On the pinned magnetic layer 34 is disposed an upper first magnetostriction-enhancing layer 35. Under the lower first magnetostriction-enhancing layer 22 is disposed a seed layer 21. On the upper first magnetostriction-enhancing layer 35 is disposed a protective layer 26.

In the embodiment shown in FIG. 5, the nonmagnetic intermediate sublayers 23b and 34b are made of the Ru—X alloy as shown in FIGS. 1 and 4, or have a laminated structure that contains the Ru subsublayer 23b2 and the second magnetostriction-enhancing subsublayer 23b3 and/or the third magnetostriction-enhancing subsublayer 23b1 as shown in FIGS. 7 and 8.

Figure 6:
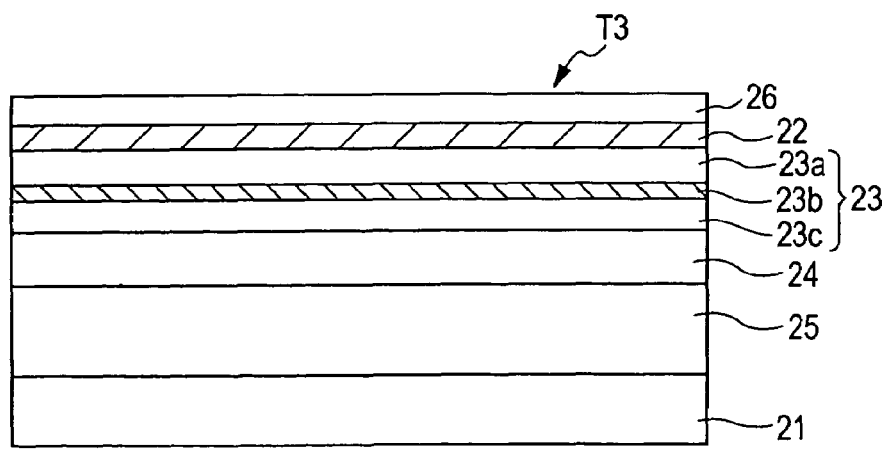
FIG. 6 is a fragmentary schematic view of the structure of a magnetoresistive sensor according to another embodiment of the present invention, viewed from the side opposite to a recording medium.

FIG. 6 is a schematic view of a multilayer structure T3 different from the multilayer structure T1 in the magnetoresistive sensor of the CPP type shown in FIG. 1. In the multilayer structure T3 shown in FIG. 6, a seed layer 21, a free magnetic layer 25, a nonmagnetic material layer 24, a pinned magnetic layer 23 (an artificial ferri structure that contains a second magnetic sublayer 23c, a nonmagnetic intermediate sublayer 23b, and a first magnetic sublayer 23a in this order from the bottom), a first magnetostriction-enhancing layer 22, and a protective layer 26 are stacked in this order from the bottom. The multilayer structure T3 shown in FIG. 6 is the reverse in the order of the layers of the multilayer structure T1 shown in FIG. 1. That is, the free magnetic layer 25 is disposed under the pinned magnetic layer 23.

Also in the magnetoresistive sensor shown in FIG. 6, the nonmagnetic intermediate sublayers 23b is made of the Ru—X alloy as shown in FIGS. 1 and 4, or have a laminated structure that contains the Ru subsublayer 23b2 and the second magnetostriction-enhancing subsublayer 23b3 and/or the third magnetostriction-enhancing subsublayer 23b1 as shown in FIGS. 7 and 8.

Since the magnetoresistive sensors in FIGS. 5 and 6 are of the current perpendicular to the plane (CPP) type, the tops and the bottoms of the multilayer structures T2 and T3 are provided with the lower shielding layer 20 and the upper shielding layer 30, which also serve as electrodes (see FIG. 1).

In FIGS. 5 and 6, the first magnetostriction-enhancing layers and the nonmagnetic intermediate sublayers are indicated by hatched lines.

Also in the multilayer structures T2 and T3 shown in FIGS. 5 and 6, the first magnetic sublayer 23a (34a) in the pinned magnetic layer 23 (34) provided in contact with the first magnetostriction-enhancing layer 22 (35) increases the magnetostriction constant of the first magnetic sublayer 23a (34a). In addition, when the entire nonmagnetic intermediate sublayer 23b is made, for example, of the Ru—X alloy having a lattice constant larger than that of Ru, the crystal structure of the first magnetic sublayer 23a is distorted from the side opposite to the first magnetostriction-enhancing layer 22, and the magnetostriction of the second magnetic sublayer 23c is distorted from the side in contact with the nonmagnetic intermediate sublayer 23b. As a result, the magnetostrictions of both the first magnetic sublayer 23a and the second magnetic sublayer 23c are increased. Such a structure entirely increases the magnetostriction constant of the pinned magnetic layer 23 (34).

As a result, the magnetization of the pinned magnetic layer 23 (34) is efficiently fixed in the height direction. The distortion or the asymmetry of a reproduced waveform resulting from the magnetization disturbance of the pinned magnetic layer 23 (34) due to the longitudinal bias field caused by the hard bias layer can also be reduced. The inversion of the pinned magnetic layer 23 (34) caused, for example, by ESD can also be reduced. Furthermore, even when the stress changes, the magnetization of the pinned magnetic layer 23 (34) can be maintained stably. Thus, a highly reliable magnetoresistive sensor can be provided.

For the materials and the crystal orientation of the first magnetostriction-enhancing layer and the pinned magnetic layer, reference should be made to those described for FIG. 1.

Figure 9:
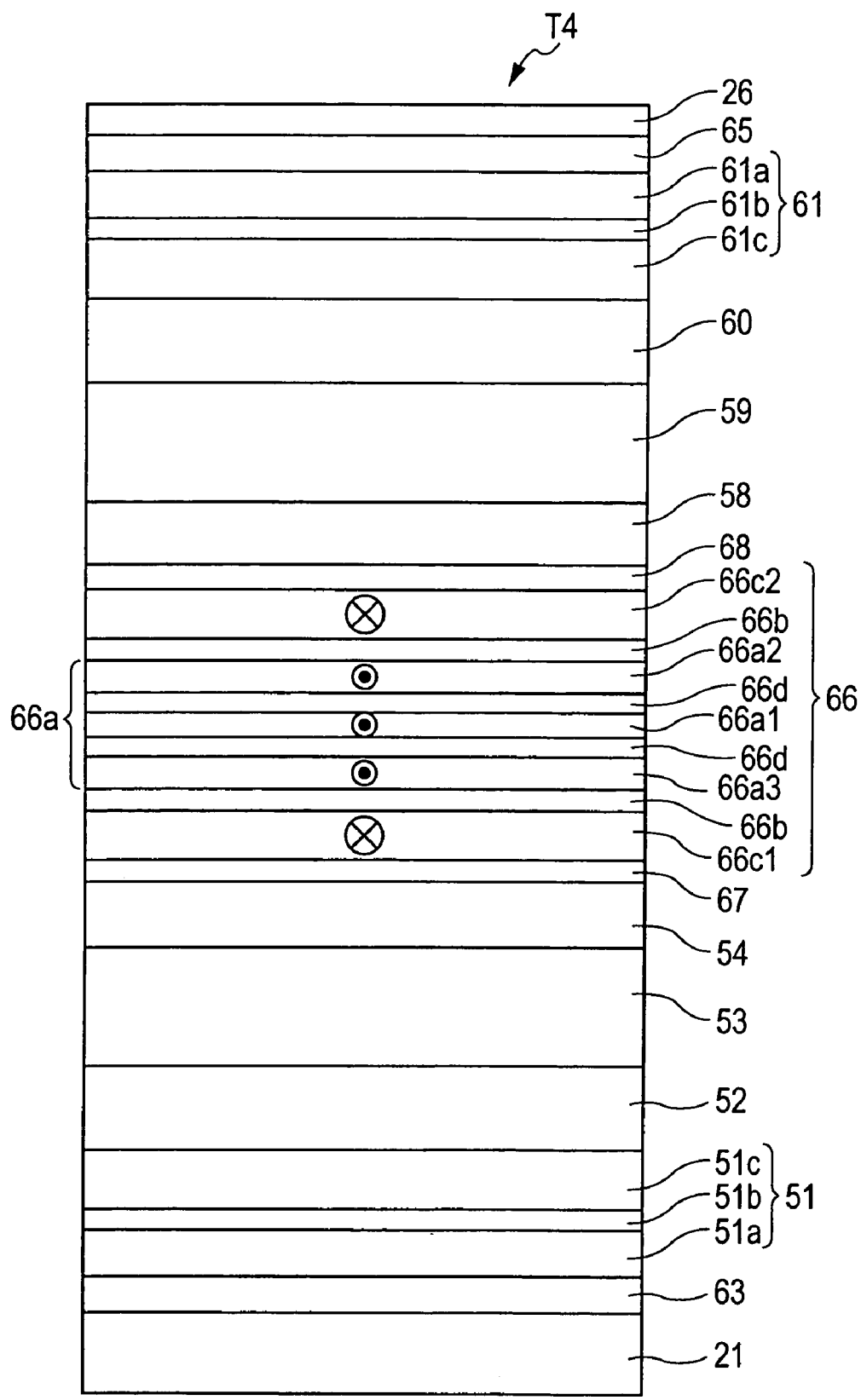
FIG. 9 is a fragmentary schematic view of the structure of a magnetoresistive sensor according to another embodiment of the present invention, viewed from the side opposite to a recording medium.

FIG. 9 is a schematic view of a multilayer structure T4 (a structure according to a fourth embodiment) different from the multilayer structure T1 in the magnetoresistive sensor of the CPP type shown in FIG. 1.

Firstly, multilayer structures T5 and T6 shown in FIGS. 10 and 11 will be described. The multilayer structure T5 in FIG. 10 and the multilayer structure T6 in FIG. 11 are comparative examples.

Figure 10:
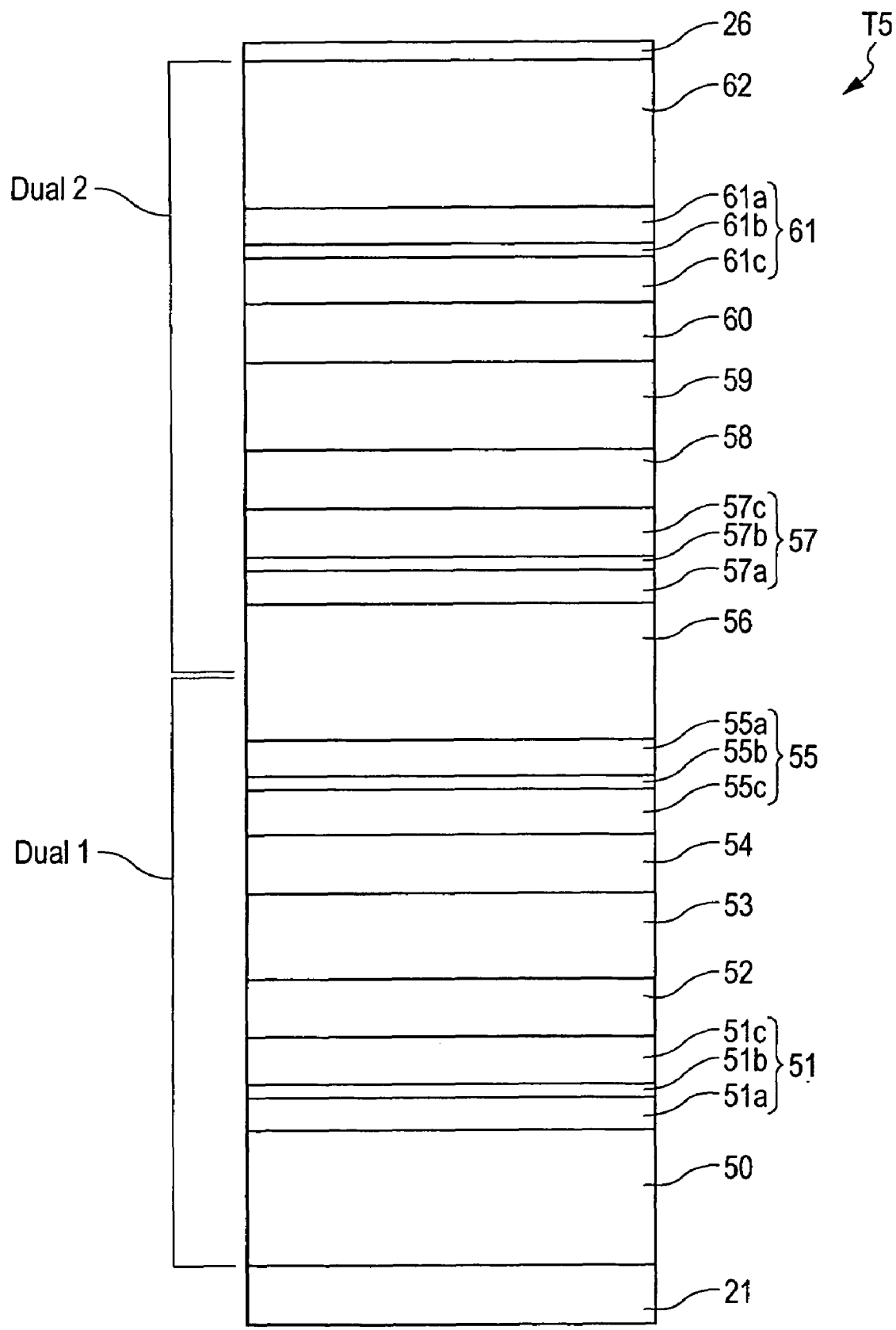
FIG. 10 is a fragmentary schematic view showing the structure of a magnetoresistive sensor as a comparative example to that in FIG. 9, viewed from the side opposite to a recording medium.
Figure 11:
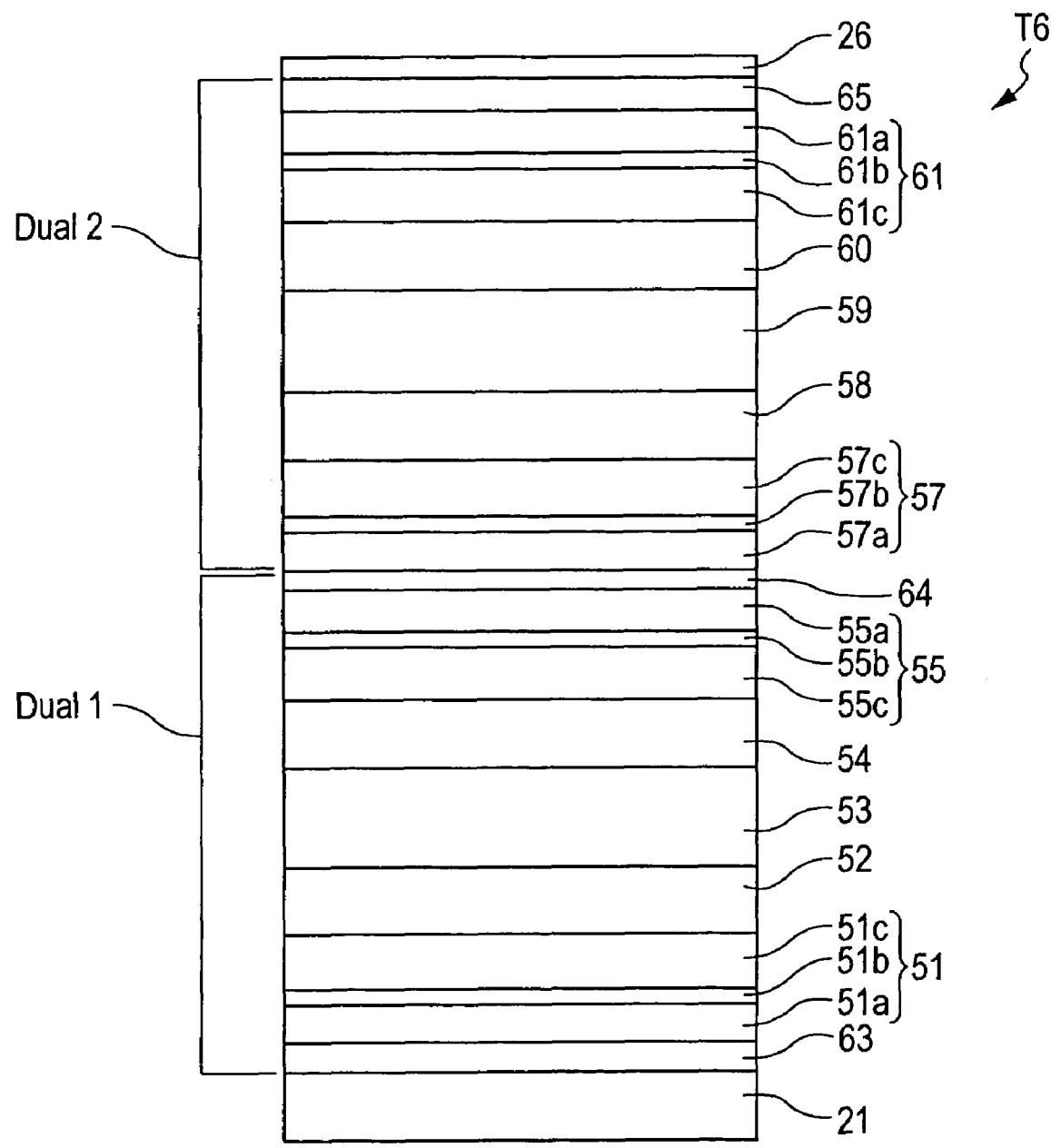
FIG. 11 is a fragmentary schematic view of the structure of a magnetoresistive sensor as a comparative example to that in FIG. 9, viewed from the side opposite to a recording medium.

The multilayer structure T5 shown in FIG. 10 contains a seed layer 21, a first antiferromagnetic layer 50, a first pinned magnetic layer 51, a first nonmagnetic material layer 52, a first free magnetic layer 53, a second nonmagnetic material layer 54 made of Cu, a second pinned magnetic layer 55, a second antiferromagnetic layer 56, a third pinned magnetic layer 57, a third nonmagnetic material layer 58, a second free magnetic layer 59, a third nonmagnetic material layer 60, a fourth pinned magnetic layer 61, a third antiferromagnetic layer 62, and a protective layer 26 in this order from the bottom. All of the four pinned magnetic layers have an artificial ferri structure.

In the multilayer structure T5 shown in FIG. 10, a laminated structure from the lowest first antiferromagnetic layer 50 to the second antiferromagnetic layer 56 in the middle of the multilayer structure T5 corresponds to the structure of the first dual spin-valve thin film device (Dual 1). A laminated structure from the second antiferromagnetic layer 56 to the top third antiferromagnetic layer 62 corresponds to the structure of the second dual spin-valve thin film device (Dual 2).

Thus, the multilayer structure T5 shown in FIG. 10 has a two-story structure of the dual spin-valve thin film devices.

In the magnetoresistive sensor of the CPP type that is principally based on a spin-dependent bulk scattering effect, the GMR effect can be obtained even with the multilayer structure T5 shown in FIG. 10. However, since the structure shown in FIG. 10 contains as many as three antiferromagnetic layers 50, 56, and 62, each of which has a large thickness and a high specific resistance, the Joule heat generated by the antiferromagnetic layers 50, 56, and 62, which serve as heat sources, causes lattice vibration or electromigration, making it impossible to improve the GMR effect and the playback output.

On the other hand, in the multilayer structure T6 shown in FIG. 11, the antiferromagnetic layers 50, 56, and 62 shown in FIG. 10 is replaced by magnetostriction-enhancing layers 63, 64, and 65. The magnetostriction-enhancing layers 63, 64, and 65 are, for example, PtMn alloys. In the multilayer structure T6 shown in FIG. 11, among magnetic sublayers constituting the pinned magnetic layers 51, 55, 57, and 61, the first magnetic sublayers 51a, 55a, 57a, and 61a, which are the farthest from nonmagnetic material layers 52, 54, 58, and 60 made of Cu, is in contact with magnetostriction-enhancing layers 63, 64, and 65. The inverse magnetostriction effect is utilized to increase the uniaxial anisotropy of the pinned magnetic layers 51, 55, 57, and 61, which in turn allows the magnetization of the pinned magnetic layers 51, 55, 57, and 61 to be fixed.

Unlike the multilayer structure T5 that contains the antiferromagnetic layers 50, 56, and 62 as shown in FIG. 10, the multilayer structure T6 that contains thin magnetostriction-enhancing layers 63, 64, and 65 instead as shown in FIG. 11 exhibits improved GMR effect and playback output.

However, even in the structure shown in FIG. 11, in particular, the magnetostriction-enhancing layer 64 disposed in the middle of the multilayer structure T6 should have a somewhat large thickness to magnetically separate dual spin-valve structures (Dual 1 and Dual 2) on and under the magnetostriction-enhancing layer 64.

Furthermore, when the magnetostriction-enhancing layers 63, 64, and 65 are made of a material having a relatively high specific resistance, such as a PtMn alloy, the magnetostriction-enhancing layers 63, 64, and 65 also serve as heat sources. Since the magnetostriction-enhancing layer 64 is in the middle of the multilayer structure T6 and is significantly away from the top electrode and the bottom electrode, the magnetostriction-enhancing layer 64 radiates the heat inefficiently. The Joule heat generated by the magnetostriction-enhancing layer 64 causes lattice vibration or electromigration. Thus, the deterioration in the GMR effect or the playback output cannot be avoided. Furthermore, in the structure shown in FIG. 11, among the magnetic sublayers constituting the pinned magnetic layers 51, 55, 57, and 61, only the first magnetic sublayers 51a, 55a, 57a, and 61a have appropriately increased magnetostriction constants λs. That is, the magnetostriction constants λs of second magnetic sublayers 51c, 55c, 57c, and 61c cannot be increased sufficiently. Thus, a structure that contains the pinned magnetic layers 51, 55, 57, and 61 having larger magnetostriction constants λs is desired.

Accordingly, the present invention provides an embodiment shown in FIG. 9. A multilayer structure T4 according to the embodiment shown in FIG. 9 contains a second pinned magnetic layer 66 consisting of nine sublayers in the middle of the structure. Above and below the second pinned magnetic layer 66 are disposed a third nonmagnetic material layer 58 and a second nonmagnetic material layer 54, a second free magnetic layer 59 and a first free magnetic layer 53, a fourth nonmagnetic material layer 60 and a first nonmagnetic material layer 52, a third pinned magnetic layer 61 and a first pinned magnetic layer 51, and an upper first magnetostriction-enhancing layer 65 and a lower first magnetostriction-enhancing layer 63.

As shown in FIG. 9, the lower first magnetostriction-enhancing layer 63, the first pinned magnetic layer 51, the first nonmagnetic material layer 52, the first free magnetic layer 53, and the second nonmagnetic material layer 54 are stacked on a seed layer 21 in this order. This laminated structure is the same as that in FIG. 11.

In FIG. 11, two pinned magnetic layers 55 and 57 that are magnetically separated by the magnetostriction-enhancing layer 64 are disposed on the nonmagnetic material layer 54. However, in FIG. 9, only one pinned magnetic layer 66 having a multilayer structure is disposed on the nonmagnetic material layer 54.

The second pinned magnetic layer 66 contains a first magnetic sublayer 66a having a five-layer structure that contains three magnetic subsublayers 66a1, 66a2, and 66a3, and upper and lower magnetostriction-enhancing subsublayers 66d, 66d each interposed between the magnetic subsublayers. The magnetostriction-enhancing subsublayers 66d, 66d are very thin and therefore do not magnetically separate each magnetic subsublayer. Thus, ferromagnetic coupling occurs between each magnetic subsublayer. This allows the magnetizations of all the magnetic subsublayers 66a1, 66a2, and 66a3 to be fixed in the same direction.

Above and below the first magnetic sublayer 66a are disposed the lower and the upper second magnetic sublayer 66c1, 66c2, for example, described in FIGS. 1 and 4, with upper and lower nonmagnetic intermediate sublayers 66b, 66b interposed therebetween. The upper and the lower nonmagnetic intermediate sublayer 66b, 66b are made of the Ru—X alloy having a lattice constant larger than that of Ru. In the embodiment shown in FIG. 9, the second pinned magnetic layer 66 has a nine-layer laminated structure.

The nonmagnetic intermediate sublayers 66b, 66b made of the Ru—X alloy can increase the magnetostriction of not only the magnetic subsublayers 66a2, 66a3, but also the lower and the upper second magnetic sublayer 66c1, 66c2, all in contact with the upper and the lower nonmagnetic intermediate sublayer 66b, 66b.

In FIG. 9, as shown in FIG. 11, a third nonmagnetic material layer 58, a second free magnetic layer 59, a fourth nonmagnetic material layer 60, a third pinned magnetic layer 61, an upper first magnetostriction-enhancing layer 65, and a protective layer 26 are stacked in this order.

While the structure shown in FIG. 11 contains two pinned magnetic layers 55 and 57 that are magnetically separated in the middle of the multilayer structure T6, in the structure shown in FIG. 9, the pinned magnetic layers 55 and 57 are replaced by one pinned magnetic layer 66 in the middle of the multilayer structure T4. As shown in FIG. 9, the first magnetic sublayer 66a in the second pinned magnetic layer 66 contains three magnetic subsublayers separated by very thin upper and lower magnetostriction-enhancing sublayers 66d. This structure can increase the magnetostriction constant of the first magnetic sublayer 66a and eliminate the relatively thick magnetostriction-enhancing layer 64 that magnetically separates the pinned magnetic layers 55 and 57 as shown in FIG. 11.

In particular, to increase the magnetostriction of the lower and the upper second magnetic subsublayer 66c1, 66c2, for example, the upper and the lower nonmagnetic intermediate sublayer 66b, 66b are made of the Ru—X alloy having a lattice constant larger than that of Ru. This ensures high strength and excellent thermal stability of the antiparallel coupling caused by the RKKY interaction, as well as increased magnetostriction of the lower and the upper second magnetic subsublayer 66c1, 66c2.

It is needless to say that the upper and the lower nonmagnetic intermediate sublayer 66b, 66b may have the laminated structure that contains the second magnetostriction-enhancing subsublayer and/or the third magnetostriction-enhancing subsublayer and the Ru subsublayer as described in FIGS. 7 and 8.

Furthermore, a first nonmagnetic intermediate sublayer 51b in the third pinned magnetic layer 51 and a third nonmagnetic intermediate sublayer 61b in the third pinned magnetic layer 61 may be made of the Ru—X alloy shown in FIGS. 1 and 4 or may have the laminated structure that contains the second magnetostriction-enhancing subsublayer and/or the third magnetostriction-enhancing subsublayer and the Ru subsublayer as shown in FIGS. 7 and 8.

Another magnetostriction-enhancing layer may be disposed at at least one interface between a plurality of the nonmagnetic material layers and the second magnetic sublayers shown in FIG. 9. This magnetostriction-enhancing layer is preferably composed of a material (one element selected from the group consisting of Pt, Au, Pd, Ag, Ir, and Rh, or a mixture thereof) having a positive spin-dependent interface scattering coefficient ($\gamma$ value) to prevent the deterioration of the GMR effect.

As compared with the structure shown in FIG. 10, in the structure shown in FIG. 9, a layer that generates a significant heat is eliminated. This prevents the deterioration of the GMR effect caused by the lattice vibration and the electromigration resulting from the generated Joule heat. This also allows the magnetization of the pinned magnetic layer 66 to be more appropriately fixed. Thus, the GMR effect and the playback output can be improved and be stabilized.

While the embodiments of the present invention are magnetoresistive sensors of the CPP type, the multilayer film structures shown in FIGS. 1, 4, 5, 6, 7, and 8 can be applied to magnetoresistive sensors of the CIP type. According to the present invention, in particular, the interface structure between the second magnetic sublayer and the nonmagnetic material layer is similar to a conventional structure. Thus, even when the present invention is applied to the magnetoresistive sensors of the CIP type, in which a spin-dependent interface scattering effect is most important to increase the resistance change ($\Delta R/R$), the magnetization of the pinned magnetic layer can be firmly fixed while the resistance change does not decrease.

What is claimed is:

1. A magnetoresistive sensor comprising a multilayer film that contains a pinned magnetic layer, a nonmagnetic material layer, and a free magnetic layer, wherein the pinned magnetic layer contains a plurality of magnetic sublayers with a nonmagnetic intermediate sublayer interposed therebetween, a first magnetostriction-enhancing layer made of a nonmagnetic metal is provided in contact with the opposite side of a first magnetic sublayer to the nonmagnetic material layer, the first magnetic sublayer being the farthest of the plurality of magnetic sublayers from the nonmagnetic material layer, at least one of the top surface or the bottom surface of at least one non magnetic intermediate sublayer has a lattice constant larger than that of Ru, at least part of crystal in the first magnetostriction-enhancing layer and in the first magnetic sublayer, and at least part of crystal in the nonmagnetic intermediate sublayer and in the magnetic sublayer in contact with a side of the nonmagnetic intermediate sublayer, the side having a lattice constant larger than that of Ru, are in an epitaxial or a heteroepitaxial state, and the pinned magnetic layer has an open end face opposite to a recording medium.

2. The magnetoresistive sensor according to claim 1, wherein the pinned magnetic layer has a three-layer structure consisting of the first magnetic sublayer, which is the farthest from the nonmagnetic material layer, a second magnetic sublayer, which is the nearest to the nonmagnetic material layer, and the nonmagnetic intermediate sublayer between the first magnetic sublayer and the second magnetic sublayer, and the nonmagnetic intermediate sublayer has a lattice constant larger than that of Ru at least at the side in contact with the second magnetic sublayer.

3. The magnetoresistive sensor according to claim 1, wherein the entire nonmagnetic intermediate sublayer is made of a nonmagnetic material having a lattice constant larger than that of Ru.

4. The magnetoresistive sensor according to claim 3, wherein the nonmagnetic intermediate sublayer is made of a Ru—X alloy, wherein the element X is selected from the group consisting of Re, Ir, Os, and Rh, or a mixture thereof.

5. The magnetoresistive sensor according to claim 1, wherein the nonmagnetic intermediate sublayer has a laminated structure that contains a Ru subsublayer composed of Ru and at least one of a second magnetostriction-enhancing subsublayer or a third magnetostriction-enhancing subsublayer each having a lattice constant larger than that of Ru on at least one of the top surface or the bottom surface of the Ru subsublayer.

6. The magnetoresistive sensor according to claim 5, wherein the second magnetostriction-enhancing subsublayer and the third magnetostriction-enhancing subsublayer are composed of one element selected from the group consisting of Re, Ir, Os, and Rh, or a mixture thereof.

7. The magnetoresistive sensor according to claim 5, wherein the second magnetostriction-enhancing subsublayer and the third magnetostriction-enhancing subsublayer have thicknesses smaller than the Ru subsublayer.

8. The magnetoresistive sensor according to claim 1, wherein at least one of:

the entire first magnetostriction-enhancing layer or the first magnetostriction-enhancing layer in the vicinity of the interface with the first magnetic sublayer, or at least a side of the nonmagnetic intermediate sublayer, the side having a lattice constant larger than that of Ru, has a face-centered cubic structure (fcc) having a preferred orientation of an equivalent crystal face represented by a {111} face in the direction parallel to the interface.

9. The magnetoresistive sensor according to claim 1, wherein at least one of:

the entire first magnetic sublayer or the first magnetic sublayer in the vicinity of the interface with the first magnetostriction-enhancing layer, or the entire magnetic sublayer in contact with a side of the nonmagnetic intermediate sublayer or the magnetic sublayer in the vicinity of the interface with the nonmagnetic intermediate sublayer, the side having a lattice constant larger than that of Ru, has a face-centered cubic (fcc) structure having a preferred orientation of an equivalent crystal face represented by a {111} face in the direction parallel to the interface.

10. The magnetoresistive sensor according to claim 1, wherein the entire first magnetic sublayer or the first magnetic sublayer in the vicinity of the interface with the first magnetostriction-enhancing layer, and/or the entire magnetic sublayer in contact with a side of the nonmagnetic intermediate sublayer or the magnetic sublayer in the vicinity of the interface with the nonmagnetic intermediate sublayer, the side having a lattice constant larger than that of Ru, has a body-centered cubic lattice (bcc) structure having a preferred orientation of an equivalent crystal face represented by a {110} face in the direction parallel to the interface.

* * * * *